US012182086B2

(12) United States Patent
Sinha et al.

(10) Patent No.: US 12,182,086 B2
(45) Date of Patent: Dec. 31, 2024

(54) GENERATING AND EXECUTING AUTOMATIC SUGGESTIONS TO MODIFY DATA OF INGESTED DATA COLLECTIONS WITHOUT ADDITIONAL DATA INGESTION

(71) Applicant: Adobe Inc., San Jose, CA (US)

(72) Inventors: Ritwik Sinha, Cupertino, CA (US);
Saayan Mitra, San Jose, CA (US);
Handong Zhao, San Jose, CA (US);
Somdeb Sarkhel, San Jose, CA (US);
Trevor Paulsen, Lehi, UT (US);
William Brandon George, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 198 days.

(21) Appl. No.: 17/347,133

(22) Filed: Jun. 14, 2021

(65) Prior Publication Data
US 2022/0398230 A1 Dec. 15, 2022

(51) Int. Cl.
*G06F 16/215* (2019.01)
*G06F 16/242* (2019.01)
(Continued)

(52) U.S. Cl.
CPC ........ *G06F 16/215* (2019.01); *G06F 16/2423* (2019.01); *G06N 5/04* (2013.01); *G06N 20/00* (2019.01)

(58) Field of Classification Search
CPC ... G06F 16/215; G06F 16/2423; G06N 20/00; G06N 5/04
See application file for complete search history.

(56) References Cited

U.S. PATENT DOCUMENTS 5,761,689 A * 6/1998 Rayson ................. G06F 40/232
715/210
5,950,190 A 9/1999 Yeager et al.
(Continued)

OTHER PUBLICATIONS

Microsoft, "Use AutoComplete when entering formulas", Microsoft.com, https://web.archive.org/web/20201028123740/https:/support.microsoft.com/en-us/office/use-autocomplete-when-entering-formulas-d51ef125-60ff-438f-ba26-d9bd6b363bbe#ID0EAACAAA=Newer_versions (Year: 2020).*

(Continued)

*Primary Examiner* — Mark D Featherstone
*Assistant Examiner* — Brooks T Hale
(74) *Attorney, Agent, or Firm* — Keller Preece PLLC

(57) ABSTRACT

The present disclosure relates to systems, non-transitory computer-readable media, and methods for generating automatic suggestions to effectively modify the organization of an ingested data collection without destruction of the underlying raw data. In particular, in one or more embodiments, the disclosed systems utilize multiple machine learning models in sequence to determine likelihoods that the organizational structure of an ingested data collection should be modified in various ways. In response to generating these likelihoods, the disclosed systems generate corresponding automatic suggestions to modify the organization of the ingested data collection. In response to a detected selection of one or more of the automatic suggestions, the disclosed systems read data out of the ingested data collection in accordance with the selected automatic suggestions to effectively modify the organization of the ingested data collection.

20 Claims, 13 Drawing Sheets

(51) Int. Cl.
  *G06N 5/04*    (2023.01)
  *G06N 20/00*   (2019.01)

(56) References Cited

U.S. PATENT DOCUMENTS

| | | | | |
|---|---|---|---|---|
| 6,047,300 | A * | 4/2000 | Walfish | G06F 40/232 |
| | | | | 715/257 |
| 6,993,473 | B2 | 1/2006 | Cartus | |
| 10,320,757 | B1 * | 6/2019 | Secker-Walker | ... H04L 63/0876 |
| 10,706,323 | B1 * | 7/2020 | Liebman | G06N 20/00 |
| 11,112,909 | B1 * | 9/2021 | Benkreira | G06F 3/016 |
| 2001/0037228 | A1 | 11/2001 | Ito et al. | |
| 2002/0116417 | A1 | 8/2002 | Weinberg et al. | |
| 2003/0183686 | A1 * | 10/2003 | Prendergast | G06Q 40/00 |
| | | | | 235/380 |
| 2011/0161311 | A1 * | 6/2011 | Mishne | G06F 16/951 |
| | | | | 707/769 |
| 2012/0117102 | A1 * | 5/2012 | Meyerzon | G06F 16/3322 |
| | | | | 707/765 |
| 2012/0117500 | A1 * | 5/2012 | Maim | G06F 40/18 |
| | | | | 715/781 |
| 2013/0091138 | A1 | 4/2013 | Liensberger et al. | |
| 2015/0249742 | A1 * | 9/2015 | Li | H04W 68/04 |
| | | | | 455/414.1 |
| 2017/0024186 | A1 * | 1/2017 | Fazl Ersi | G06F 18/23211 |
| 2020/0302506 | A1 * | 9/2020 | Parker | G06Q 30/0631 |
| 2021/0049006 | A1 * | 2/2021 | Tommasi | G06F 9/44505 |
| 2021/0182935 | A1 * | 6/2021 | Malkiel | G06F 16/3347 |
| 2021/0224258 | A1 * | 7/2021 | Faruquie | G06F 16/244 |
| 2022/0382824 | A1 * | 12/2022 | Kajinaga | G06F 16/24578 |
| 2023/0040678 | A1 * | 2/2023 | Karlin | H04N 21/251 |

OTHER PUBLICATIONS

Custom Guide, "How to Import Data into Excel", www.customguide.com, https://web.archive.org/web/20201023020115/https://www.customguide.com/excel/how-to-import-data-into-excel (Year: 2020).*

Dickinson, "Microsoft Word2013: AutoCorrect and Auto Format", https://web.archive.org/web/20170721160035/https:www.dickinson.edu/download/downloads/id/2530/word_auto (Year: 2017).*

U.S. Appl. No. 17/347,164, filed Jul. 27, 2022, Office Action.

Gordeyuk, Victor; ScienceSoft; "See to Your Sales Data Hygiene with Salesforce Data Cleansing"; Published Sep. 8, 2019; https://www.scnsoft.com/blog/salesforce-data-cleansing.

Steinbach, Michael, George Karypis, and Vipin Kumar. "A comparison of document clustering techniques." (2000).

Deng, Jiabin, et al. "An improved fuzzy clustering method for text mining." 2010 Second International Conference on Networks Security, Wireless Communications and Trusted Computing. vol. 1. IEEE, 2010.

Jacob Devlin, Ming-Wei Chang, Kenton Lee, Kristina Toutanova: BERT: Pre-training of Deep Bidirectional Transformers for Language Understanding. NAACL-HLT (2019).

Mikolov, Tomas, et al. "Efficient estimation of word representations in vector space." arXiv preprint arXiv:1301.3781 (2013).

Stanovsky, Gabriel, and Mark Hopkins. "Spot the odd man out: Exploring the associative power of lexical resources." Proceedings of the 2018 Conference on Empirical Methods in Natural Language Processing. (2018).

George A. Miller. "Wordnet: A lexical database for English". Communication ACM, 38:39-41. (1992).

Christiane D. Fellbaum. "Book reviews: Wordnet: An electronic lexical database". (1998).

Jeffrey Pennington, Richard Socher, and Christopher D Manning. "Glove: Global vectors for word representation." In EMNLP, vol. 14, pp. 1532-1543. (2014).

Matthew E. Peters, Mark Neumann, Mohit Iyyer, Matt Gardner, Christopher Clark, Kenton Lee, and Luke Zettlemoyer. "Deep contextualized word representations". CoRR, abs/1802.05365. (2018).

Sai Muralidhar Jayanthi, et al. NeuSpell: A Neural Spelling Correction Toolkit. EMNLP (2020).

U.S. Appl. No. 17/347,164, Dec. 9, 2022, Office Action.

Educba, "Spell Check in Excel", https://web.archive.org/web/20210127112242/https://www.educba.com/excel-spell-check/ (Year: 2021).

U.S. Appl. No. 174/347,164, Mar. 14, 2023, Office Action.

Chris Facer, "What is Data Filtering?", Displayr, Retrieved from the Internet: URL: https://web.archive.org/web/20201127082609/https://www.displayr.com/what-is-data-filtering.

Educba, Spell Check in Excel, Retrieved from the Internet: URL: https://web.archive.org/web/20210127112242/https://www.educba.com/excel-spell-check/.

U.S. Appl. No. 17/347,164, Sep. 6, 2023, Office Action.

Diana, "AutoCorrect in Word", https://web.archive.org/web/20210303181133/http://www/myrenocomputertutor.com/autocorrect-in-word/ (Year: 2021).

U.S. Appl. No. 17/347,164, Jan. 3, 2024, Office Action.

* cited by examiner

GENERATING AND EXECUTING AUTOMATIC SUGGESTIONS TO MODIFY DATA OF INGESTED DATA COLLECTIONS WITHOUT ADDITIONAL DATA INGESTION

BACKGROUND

Recent years have seen significant improvements in data tracking and analysis. For example, conventional systems collect, ingest, and analyze large amounts of data in order to provide analytical insights. To illustrate, conventional systems often track user interactions with touchpoints, such as a website in order to gain insight about how users arrive at the website, website content that attracts users, how users interact with website elements, and conversions. During or after collection, the data is ingested to allow for analysis.

Although conventional systems track and analyze data, such systems have a number of problems with regard to flexibility, accuracy, and efficiency of operation. For instance, conventional systems are generally restricted to rigid systems of data organization at data ingestion time. Thus, if any underlying problems exist in the schema (e.g., data mis-labeling, incorrect data categorization), these problems inflexibly persist when data is ingested into the system of organization. Moreover, when conventional systems allow correction of the system of data organization associated with an ingested data collection, it requires expert knowledge. Even when conventional systems enable schema correction, conventional systems rigidly apply these corrections only to data ingested after the schema correction— leaving previously ingested data incorrectly configured and a split in the data.

The inflexibility of conventional systems further leads to additional problems with regard to accuracy and efficiency of operation. For example, conventional systems may inaccurately funnel data based on an erroneous schema. These inaccuracies are further amplified when reports are generated based on those ingested data collections. In addition to this, conventional systems generally offer only one route to correcting error-laden systems of data organization; namely, time and computing resource heavy correction of the system of data organization and re-ingestion of the data. This, in-turn, leads to destruction of originally ingested data.

Furthermore, the inflexibilities and inaccuracies of conventional systems further result in various computational inefficiencies. For example, in order to overcome the shortcomings of conventional systems, users often employ difficult and costly post-ingestion patches that require large amounts of time and computing resources to implement. In implementing these additional post-ingestion patches, conventional systems waste vast amounts of processing power and digital memory spent in running queries, generating displays, and storing mid-correction analysis results.

These along with additional problems and issues exist with regard to conventional analysis systems.

BRIEF SUMMARY

This disclosure describes one or more embodiments of systems, non-transitory computer-readable media, and methods that solve one or more of the foregoing or other problems in the art. In particular, the disclosed systems generate automatic suggestions and corrections to effectively modify systems of organization associated with ingested data collections without requiring additional data ingestion. For example, the disclosed systems generate and then execute automatic suggestions to effectively modify organizational elements within a system of data organization associated with an ingested data collection at query time. In one or more embodiments, the disclosed system generate the automatic suggestions in response to analyzing the elements within the system of data organization to identify, for example, organizational elements that should likely be merged, removed, renamed, and otherwise modified. In response to a detected selection of one or more of the automatic suggestions, the disclosed systems effectively modify the organizational elements that correspond with the selected automatic suggestions without destroying the data already ingested into those organization elements or requiring an additional ingestion of the data. For example, the disclosed system effectively modify the organization elements by generating one or more fallback regular expressions incorporating the selected automatic suggestions that causes data to be read from the ingested data collection in a manner that corrects or accounts for errors within the system of data organization.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
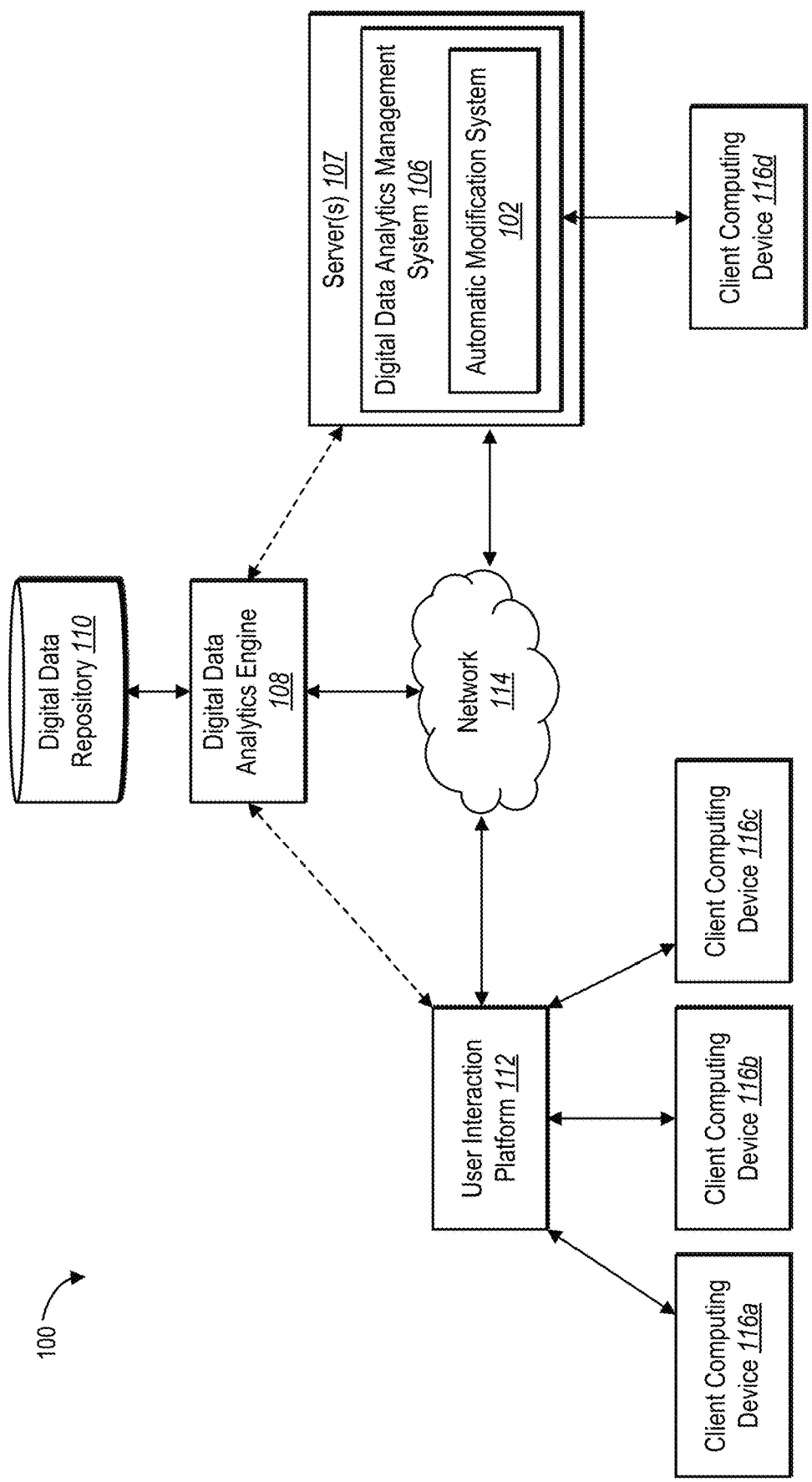
FIG. 1 illustrates a diagram of an environment in which an automatic modification system can operate in accordance with one or more embodiments.

This disclosure describes one or more embodiments of an automatic modification system that generates and executes automatic suggestions to modify the organization of an ingested data collection after raw data ingestion and without requiring additional data ingestion. To generate an automatic suggestion, for example, the automatic modification system analyzes dimension items of dimensions that categorize data ingested into an ingested data collection to determine a likelihood that one or more dimension items should be modified. For example, in one or more embodiments, the automatic modification system sequentially utilizes machine learning models to analyze dimension items of a dimension of an ingested data collection to generate a variety of automatic suggestions to modify the dimension items of the dimension. In response to a detected selection of one or more of the automatic suggestions associated with the dimension items, the automatic modification system identifies and effectively modifies the dimension items at query time as part of generating a report or other query response. For example, the automatic modification system utilizes the selected automatic suggestions to query or read data from the instead data collection in a manner that corrects or otherwise accounts for the organizational errors identified by the automatic suggestions. Furthermore, as the automatic modification system makes the corrections as part of responding to a query, the automatic modification system does so without altering or otherwise modifying the raw data organized within the ingested data collection itself.

In more detail, the automatic modification system receives an ingested data collection as raw data ingested into a system of organization (e.g., a schema) from a digital data analytics engine. For instance, the digital data analytics engine receives and/or otherwise amasses raw analytics data from one or more user interaction platforms. For example, the raw data includes analytics data associated with all touchpoints associated with a third-party or remote computing system. If the third-party is associated with both an e-commerce website and a brick-and-mortar retail location, the digital data analytics engine receives raw data associated with in-person purchases (e.g., retail location identifiers, time and date of purchases, types of purchases), interactions with a website (e.g., page lands, link clicks, page scrolls, cart additions), and online purchases (e.g., time and date of online purchases, types of online purchases, time products are left in carts prior to purchase). The digital data analytics engine receives and ingests the raw data in a schema that organizes the raw data into an ingested data collection. For example, the system of organization organizes the raw data into a plurality of dimensions and dimension items associated with each dimension, where each dimension is associated with a pre-defined input (e.g., URLs, cities, user IDs, etc.).

More specifically, in order to generate comprehensive and intuitive analysis of raw data, the digital data analytics engine generates and maintains pre-configured systems of organization (e.g., schema) for organizing data. In one or more embodiments, a schema includes a plurality of dimensions (e.g., data buckets or storage compartments) and associated dimension items, where the digital data analytics engine generates each dimension to receive a pre-defined type or association of raw data. For instance, the digital data analytics engine generates a dimension that receives or ingests only raw data associated with cities of users who land on a particular web page, such that the dimension includes dimension items defined by particular city names (e.g., "New York," "San Francisco," "Denver").

Accordingly, the digital data analytics engine ingests raw data into a schema of dimensions based on the specification and/or configuration of each dimension in the schema to generate an ingested data collection. To illustrate, for example, the digital data analytics engine ingests raw data into the dimension associated with cities by funneling raw data into the dimension items that correspond with cities indicated by the raw data. More specifically, if a raw data item indicates that a user who landed on a particular web page lives in "New York," the digital data analytics engine funnels that raw data into the "New York" dimension item of the cities dimension.

If one or more dimensions and/or dimension items of the schema are incorrectly specified or configured, the digital data analytics engine may incorrectly ingest the raw data. These incorrect dimensions and/or dimension items create errors within the ingested data collection that are often not readily apparent until after ingestion of raw data occurs and is analyzed. Accordingly, the automatic modification system generates and implements automatic suggestions to effectively modify dimensions and/or dimension items when reading data out of an ingested data collection as part of querying the data—without necessitating an additional ingestion of the raw data or destroying any underlying raw data within the ingested data collection.

In one or more embodiments, the automatic modification system generates, without user input, one or more automatic suggestions to modify dimensions and/or dimension items in response to receiving an ingested data collection from the digital data analytics engine. In additional or alternative embodiments, the automatic modification system generates one or more automatic suggestions to modify dimensions and/or dimension items in response to receiving an analysis request associated with the dimension and/or dimension item. In additional or alternative embodiments, the automatic modification system generates one or more automatic suggestions to modify dimensions and/or dimension items in response to receiving a query to identify dimensions and/or dimension items that should likely be modified. For example, in at least one embodiment, the automatic modification system detects or receives a query associated with a dimension in response to a user selecting an option to analyze a dimension for one or more dimension items that should likely be modified.

To generate one or more automatic suggestions to modify a dimension, the automatic modification system sequentially determines likelihoods that dimensions and/or dimension items should be modified in a number of ways. For example, in one or more embodiments, the automatic modification system determines a likelihood that two or more dimension items of the dimension should be merged into one dimension item. Following that determination, the automatic modification system determines a likelihood that one or more dimension items of the dimension should be renamed (e.g., due to a spelling error). Next, the automatic modification system determines a likelihood that one or more dimension items of the dimension should be removed. In additional or alternative embodiments, the automatic modification system determines likelihoods that dimensions and/or dimension items should be modified in additional ways.

In at least one embodiment, the automatic modification system makes modification likelihood determinations utilizing one or more machine learning models. For example, in one embodiment, the automatic modification system utilizes a first machine learning model to determine a likelihood that specific dimension items of the dimension should be merged. The automatic modification system then utilizes a second machine learning model to determine a likelihood that dimension items of the dimension should be renamed. The automatic modification system then utilizes a third machine learning model to determine a likelihood that dimension items of the dimension should be removed.

Based on the determined likelihoods, the automatic modification system generates automatic suggestions to modify dimension items of the dimension. For example, the automatic modification system generates automatic suggestions that state the specific modification indicated by each determined likelihood. To illustrate, in response to generating a high determined likelihood that a dimension item "Sanfrancisco" should be merged with a "San Francisco" dimension item, the automatic modification system generates an automatic suggestion stating that the "Sanfrancisco" should be merged with a "San Francisco" dimension item. In another example, in response to generating a high determined likelihood that a dimension item named "cayn" should be named "cyan." In another example, in response to generating a high determined likelihood that a dimension item named "blue" should be removed from a dimension with other dimension items named after U.S. cities.

The automatic modification system provides the generated automatic suggestions via one or more displays in connection with the associated dimension. For example, the automatic modification system provides the display of the generated automatic suggestions in connection with a dimension report showing the dimension items of the dimension. For instance, the automatic modification system generates the display including selectable elements associated with each of the generated automatic suggestions that enables a user to select one or more of the automatic suggestions in connection with the active ingested data collection.

In response to a detected selection of one or more of the automatic suggestions, the automatic modification system modifies the dimension items associated with the selected automatic suggestions when extracting data in response to a query. For example, in response to a detected selection of an automatic suggestion, the automatic modification system generates a fallback regular expression incorporating the selected automatic suggestion. The automatic modification system then identifies the dimension items referenced by the fallback regular expression and effectively modifies the identified dimension items in accordance with the instructions in the fallback regular expression when reading data from the ingested data collection.

To illustrate, in one or more embodiments, the fallback regular expression acts as an instruction layer that controls how data is read from the ingested data collection in response to a query. In particular, a fallback regular expression causes the automatic modification system to return data in response to a query in a manner that corrects or accounts for errors in the schema used to ingest the data or for desired user changes to the schema that may not be the result of an error.

As mentioned above, the automatic modification system provides many technical advantages and benefits over conventional analytics system. For example, as discussed above, conventional systems rely on rigid predefined systems of organization for funneling raw data into an ingested data collection to allow for analysis. Thus, when data is ingested into an ingested data collection according to a rigid schema that includes errors, conventional systems generally provide inaccurate results. To overcome this, conventional systems require knowledgeable analysts to run computationally expensive database queries or use data pipelines to correct the incorrectly organized data. These additional steps are costly and slow, and require large amounts of computing resources to run and re-run queries, generate displays, store and update results, and otherwise enable modification of an ingested data collection. Furthermore, such data manipulation can have destructive effects on the underlying data. If the analyst prefers instead to correct the schema associated with the ingested data collection, conventional systems require that the data be re-ingested into the ingested data collection to reflect the corrected schema—which wastes further computing resources.

Contrary to this, the automatic modification system makes computing systems more flexible by generating and executing automatic suggestions to effectively modify and correct a system of organization (e.g., a schema) of an ingested data collection without necessitating re-ingestion of the data. For example, rather than requiring—and expending computing resources in—correcting the organization of an ingested data collection that has been organized according to a flawed schema, the automatic modification system automatically determines dimensions and dimension items that should likely be corrected, and then effectively modifies those dimensions and dimension items by changing how data is read out of those dimensions and dimension items at query time—all without destroying the underlying data organized therein. Moreover, the automatic modification system generates the automatic suggestions to modify the dimensions and dimension items without any prior knowledge of the organizational configuration of those dimensions and dimension items. Thus, unlike conventional systems, the automatic modification system does not rely on the expert knowledge to correct the system of organization associated with an ingested data collection.

Additionally, the automatic modification system increases the accuracy of a computing system that provides analytics and other data analysis. For example, the automatic modification system greatly increases the accuracy of reports, displays, and other insights generated by automatically determining that organizational elements of an ingested data collection should likely be modified or corrected in response to a query to read data from the organizational element. For example, the automatic modification system increases the accuracy of a report based on data that originally includes one or more errors utilizing one or more automatic suggestions that, when selected, correct how data is read from the associated ingested data collection into the report—thereby correcting the errors in the underlying data.

Moreover, the automatic modification system increases the efficiency of a computing system executing an analytics system. For example, as discussed above, conventional systems expend large amounts of computing resources (e.g., processing power, computer memory, etc.) in enabling modification of an ingested data collection that is incorrectly organized based on a flawed schema. Conversely, the automatic modification system increases computational efficiency by generating and executing automatic suggestions that cause data to be correctly read from a flawed schema—without any prior knowledge of the schema, and without requiring the computational resources typically expended in generating the multiple displays, reports, and other interfaces typically needed to modify an ingested data collection organized according to the same flawed schema.

Furthermore, the automatic modification system further increases the speed of a computing system executing an analytics system. For example, conventional systems generally require that organizational errors within an ingested data collection be addressed by re-ingesting the entire data collection—a process that can take hours, days, or even weeks. The automatic modification system drastically speeds this process by generating and implementing automatic suggestions to modify how data is read from an ingested data collection. Thus, the automatic modification system generates and invokes automatic suggestions that correctly read data from an incorrectly configured dimension or dimension item in seconds or less.

As illustrated by the foregoing discussion, the present disclosure utilizes a variety of terms to describe features and advantages of the automatic modification system. Additional detail is now provided regarding the meaning of such terms. For example, as used herein, the term "system of data organization" or "schema" refers to instructions, definitions, and/or structures for feeding or tagging data into or in association with one or more data structures. To illustrate, in one embodiment, a schema includes instructions for ingesting (e.g., tagging) raw data into one or more dimensions and associated dimension elements. For instance, a schema defines a dimension such that the dimension accepts specific types and/or segments of raw data. In one embodiment, a schema specifies a dimension that ingests or tags raw data associated with a particular identifier, name, or metadata. In one or more embodiments, a schema defines a dimension that includes dimension items.

As used herein, the term "dimension" refers to set, category, or classification of values for organizing or attributing underlying data (e.g., a set of values for analyzing, grouping, organizing, or comparing data). For example, dimensions comprise broad categories of data or narrow and specific categories. Example dimensions include geographic location (e.g., country, state, or city), browser, referrer, search engine, device type, product, webpage, gender, purchase, downloads, age, digital content campaign, etc.

As used herein, a "dimension item" refers to a sub-category or member of a dimension. For example, a schema defines a dimension for "Cities" and includes dimension items specific to particular city names (e.g., "London," "Paris," "New York"). Dimensions and dimension items are associated with various components. For example, a dimension and/or dimension item is associated with components such as, but not limited to: a title or name, an input data type, an input data size, input formatting rules, exception rules, and so forth.

As used herein, the term "ingestion" refers to a process of aggregating, consolidating, and organizing raw data according to a schema or system of data organization. For example, the automatic modification system ingests raw data from one or more sources into one or more dimensions based on a particular schema. As used herein, an "ingested data collection" refers to an amount of raw data that has been ingested into one or more dimensions and corresponding dimension items based on a particular schema.

As used herein, "query time" refers to a point at which a system can query an ingested data collection. Specifically, data collection can take weeks, months, or years. Similarly, data ingestion can take place simultaneously with data collection, intermittently with data collection, or after data collection. In any event, the automatic modification system ingests collected data to allow for further analysis. For example, once the automatic modification system receives an ingested data collection from the digital data analytics engine, the automatic modification system is able to run queries against ingested data collection because the data is organized based on a specific schema. Unlike conventional systems, at this point (i.e., at "query time"), the automatic modification system is able to generate one or more derived dimensions that correct or otherwise modify how data is read from the ingested data collection. Specifically, as described in more detail below, the automatic modification system corrects or otherwise modifies how data is read from an ingested data collection, on the fly at query time without having to re-ingest the data at query time.

As used herein, "raw data" refers to digital information associated with user touchpoints. For example, raw data includes: URL data associated with user interactions with one or more websites and/or web pages, sales data from one or more websites and/or brick-and-mortar retail locations, user profile information, and other user account information. In one or more embodiments, a digital data analytics engine receives raw data as part of a batch process, from a tracking pixel, from an API, or from a direct data stream.

As used herein, a "derived dimension" refers to a dimension that is generated on-the-fly relative to an ingested data collection. For example, the automatic modification system generates a derived dimension relative to an ingested data collection that effectively modifies the organization of the ingested data collection by changing how specific data is read from the ingested data collection when executing an automatic suggestion at query time.

Additional detail regarding the automatic modification system will now be provided with reference to the figures. For example, FIG. 1 illustrates a schematic diagram of an example system environment 100 (e.g., the "environment" 100) for implementing an automatic modification system 102 in accordance with one or more embodiments. Thereafter, a more detailed description of the components and processes of the automatic modification system 102 is provided in relation to the subsequent figures.

As shown in FIG. 1, the environment 100 includes server(s) 107, a digital data analytics engine 108, a user interaction platform 112, client computing devices 116a-116d, and a network 114. Each of the components of the environment 100 communicate via the network 116, and the network 116 may be any suitable network over which computing devices communicate. Example networks are discussed in more detail below in relation to FIG. 7.

As mentioned, the environment 100 includes the client computing devices 116a, 116b, 116c, and 116d. The client computing devices 116a-116d include one of a variety of computing devices, including a smartphone, tablet, smart television, desktop computer, laptop computer, virtual reality device, augmented reality device, or other computing device as described in relation to FIG. 7. Although FIG. 1 illustrates a number of client computing devices 116a-116d, in some embodiments, the environment 100 includes multiple different client computing devices, each associated with the same or other components of the environment 100.

As illustrated in FIG. 1, the environment 100 includes a user interaction platform 112. In one or more embodiments, the user interaction platform 112 is any platform that receives and/or collects raw data from client computing device 116a-116c. For example, the user interaction platform 112 is a third-party server that tracks user interaction data associated with one or more specific websites, retail locations, and other user touchpoints. Additionally or alternatively, the user interaction platform 112 is a tracking pixel embedded in a web page that detects and/or collects data associated with the web page. Additionally or alternatively, the user interaction platform 112 is a software development kit (SDK) that enables one or more third-party servers to communicate raw data to other components of the environment 100. In at least one embodiment, the user interaction platform 112 communicates raw data to the digital data analytics engine 108 via the network 114, or directly (e.g., indicated by the dashed line).

As illustrated in FIG. 1, the environment 100 includes the digital data analytics engine 108. In one or more embodiments, the digital data analytics engine 108 receives and ingests raw data based on one or more schema or systems of data organization. For example, based on the instructions of a schema, the digital data analytics engine 108 receives and ingests raw data into one or more preconfigured dimensions and associated dimension items—thereby creating an ingested data collection. The digital data analytics engine 108 stores ingested data collections, schema, received raw data, and other metadata associated with ingested data collections in a digital data repository 110.

As illustrated in FIG. 1, the environment 100 includes the server(s) 107. The server(s) 107 may include one or more individual servers that may generate, store, receive, analyze, and transmit electronic data. For example, the server(s) 107 may include a digital data analytics management system 106, which in turn implements the automatic modification system 102. In one or more embodiments, the digital data analytics management system 106 receives and analyzes data in various ways. To illustrate, the digital data analytics management system 106 receives ingested data collections and associated schema from the digital data analytics engine 108. The digital data analytics management system 106 then analyzes the ingested data collection based on the dimensions and other organizational structures therein. The digital data analytics management system 106 also generates reports based on the analyses, and generates user interfaces including the reports for the client computing device 116d (e.g., an analyst client computing device). Additionally or alternatively, the digital data analytics management system 106 receives and ingests raw data from the user interaction platform 112. The digital data analytics management system 106 receives ingested data collections and schema from the digital data analytics engine 108 via the network 114 or directly (e.g., indicated by the dashed line).

As further illustrated in FIG. 1, the digital data analytics management system 106 implements the automatic modification system 102. In one or more embodiments, the automatic modification system 102 generates automatic suggestions to modify the organization of ingested data collections. As will be discussed in greater detail below, the automatic modification system 102 generates automatic suggestions that retroactively (e.g., post-ingestion) modifies how data is read from existing dimensions and/or dimension items within ingested data collections without destroying the data within the ingested data collections.

Although FIG. 1 illustrates the components of the environment 100 connected in a specific configuration, other embodiments are possible. For example, the digital data analytics management system 106 receives raw data directly from the user interaction platform 112. Additionally or alternatively, the digital data analytics engine 108 is implemented on the server(s) 107 along with the digital data analytics management system 106. Similarly, while FIG. 1 illustrates a given number of servers, platforms, and client computing devices, in additional or alternative embodiments the functionality of the components of the environment 100 is implemented by any number of servers, platforms, and client computing devices.

Figure 2:
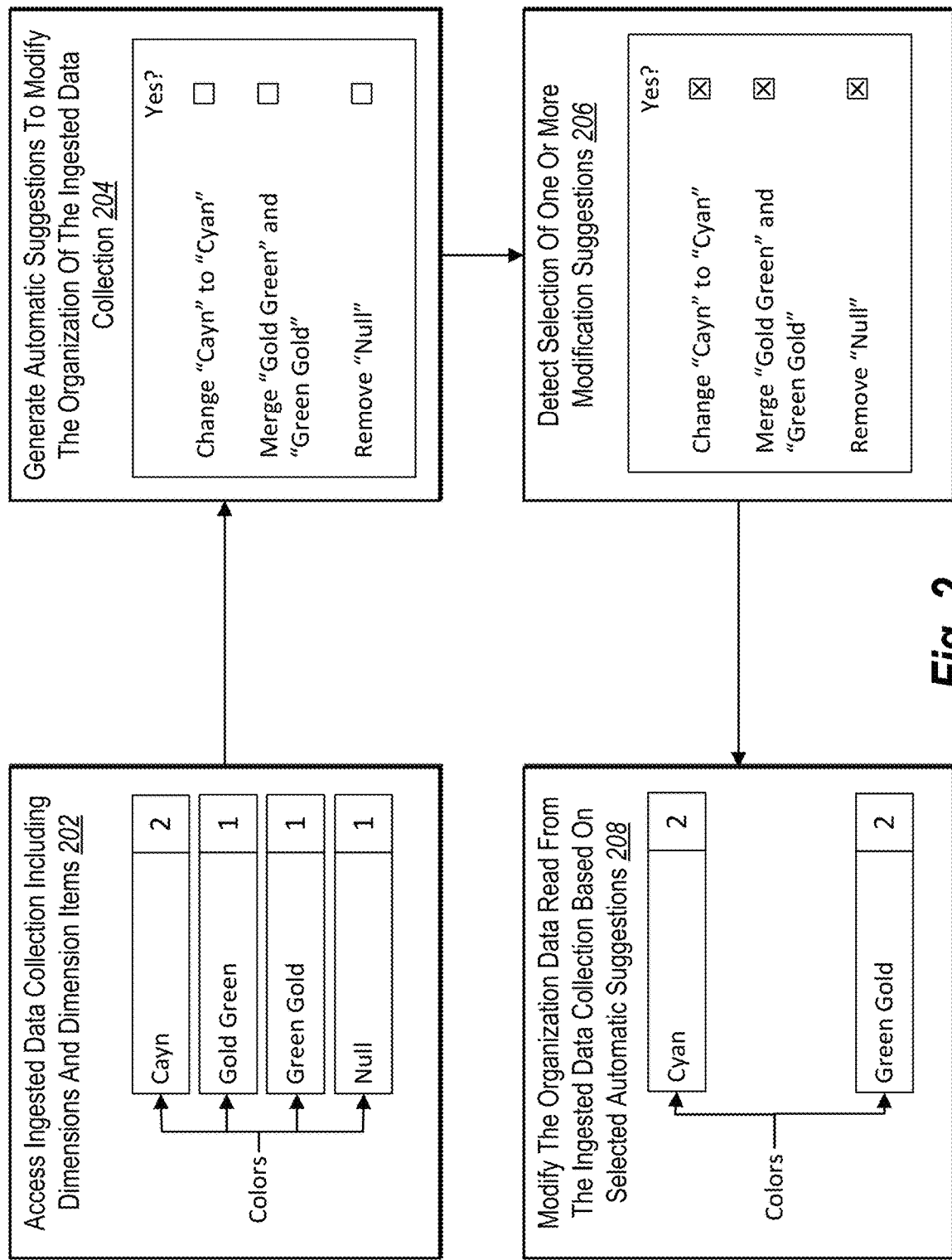
FIG. 2 illustrates a diagram of the automatic modification system generating automatic suggestions to modify the organization of an ingested data collection and then effectively modifying the organization of the ingested data collection, at query time, based on the selected automatic suggestions in accordance with one or more embodiments.

As mentioned above, the automatic modification system 102 generates automatic suggestions to modify the organization of ingested data collections returned in response to a query. FIG. 2 illustrates an overview of the automatic modification system 102 generating and executing automatic suggestions to modify dimension items of a dimension organization data within the ingested data collection. For example, the automatic modification system 102 performs an act 202 of accessing an ingested data collection including dimension and dimension items. To illustrate, in at least one embodiment, the digital data analytics engine 108 generates an ingested data collection by receiving raw data from the user interaction platform 112 and organizing the received raw data into the ingested data collection based on a schema or system of data organization. In one or more embodiments, the schema or system of data organization defines dimensions (or categories) and dimension items (or sub-categories). Accordingly, the digital data analytics engine 108 generates the ingested data collection by comparing incoming raw data to the definitions or configurations of the dimensions and associated dimension items, and organizing the raw data into the dimensions and dimension items that correspond with the raw data.

The automatic modification system 102 further performs an act 204 of generating automatic modification suggestions. In one or more embodiments, the automatic modification system 102 generates automatic suggestions to modify the organization of an ingested data collection returned in response to a query. For example, the digital data analytics management system 106 can receive or detect a request to perform analytics and generate reports based on a particular ingested data collection. The digital data analytics management system 106 then requests the particular ingested data collection from the digital data analytics engine 108. Additionally or alternatively, the digital data analytics management system 106 receives the particular ingested data collection without submitting a request to the digital data analytics engine 108 because of a preconfigured schedule or rule that causes the digital data analytics engine 108 to send the particular ingested data collection at regular time intervals or each time the particular ingested data collection is updated. In at least one embodiment, the automatic modification system 102 generates one or more automatic modification suggestions when the digital data analytics management system 106 receives the particular ingested data collection from the digital data analytics engine 108.

Additionally or alternatively, the automatic modification system 102 generates automatic modification suggestions in response to receiving a user query associated with a particular ingested data collection. For example, in one embodiment, the automatic modification system 102 detects a user selection of an option within the digital data analytics management system 106 (e.g., a button or other display element within a user interface) requesting that one or more automatic suggestions to modify a particular ingested data collection be generated. In another embodiment, the automatic modification system 102 receives a user query in response to a detected user selection of a particular dimension within an active ingested data collection.

In one or more embodiments, the automatic modification system 102 generates one or more automatic suggestions to effectively modify the ingested data collection utilizing one or more machine learning models in connection with the dimensions and dimension items of the ingested data collection. For example, in one embodiment, the automatic modification system 102 sequentially utilizes a series of machine learning models in connection with the dimension items of at least one dimension to generate automatic suggestions to modify the dimension items in various ways. To illustrate, the automatic modification system 102 sequentially utilizes a merge machine learning model, a renaming machine learning model, and a removal machine learning model to generate automatic suggestions to merge dimension items, rename dimension items, and remove dimension items, respectively.

In response to generating the automatic suggestions to modify the organization of the ingested data collection, the automatic modification system 102 also generates a display of the generated automatic suggestions. For example, in one embodiment, the automatic modification system 102 generates a display of selectable options where each selectable option is associated with a particular automatic suggestion. In at least one embodiment, the automatic modification system 102 overlays the generated display on an interface of the digital data analytics management system 106 such as an interface including a report of a dimension of the ingested data collection that includes the dimension items referenced by the automatic suggestions.

Thus, in one or more embodiments, the automatic modification system 102 performs the act 206 of detecting a selection of one or more automatic suggestions. For example, in at least one embodiment, the automatic modification system 102 receives or detects selections of one or more selectable options within the generated display. Accordingly, the automatic modification system 102 enables the user to select one, some, or all of the generated automatic suggestions.

The automatic modification system 102 also performs an act 208 of modifying the organization of data returned or read from the ingested data collection based on the selected automatic suggestions. For example, the automatic modification system 102 determines the automatic suggestions corresponding to the detected selected options within the generated display. In one or more embodiments, the automatic modification system 102 then identifies one or more dimensions items and/or dimensions of the ingested data collection that correspond with the selected automatic suggestions.

Finally, as will be discussed in greater detail below, the automatic modification system 102 modifies the identified dimensions items and/or dimensions read from the ingested data collection according to the selected automatic suggestions. In particular, the automatic modification system 102 utilizes the selected automatic suggestions to query the dimension items and/or dimensions in a manner that the correction or modification associated with the selected automatic suggestions is reflected in the data returned in response to the query. More particularly, the automatic modification system 102 generates one or more fallback regular expressions corresponding to the selected automatic suggestions.

As used herein, a meta-field is a data location to which the automatic modification system 102 loads and stores (in some embodiments temporarily) corrected data collected/filtered/ merged etc. in accordance with the fallback regular expression. The meta-field is a storage location separate from the ingested data collection. Thus, in one or more embodiments, the automatic modification system 102 reads data from the ingested data collection according to the fallback regular expression into the meta-field without modifying the data in the ingested data collection. In at least one embodiment, the automatic modification system 102 updates a displayed report of the ingested data collection (e.g., an analysis report of a dimension including the dimension items of the dimension relative to one or more metrics) to reflect the data correctly read from the ingested data collection in response to the selected automatic suggestions.

Figure 3A:
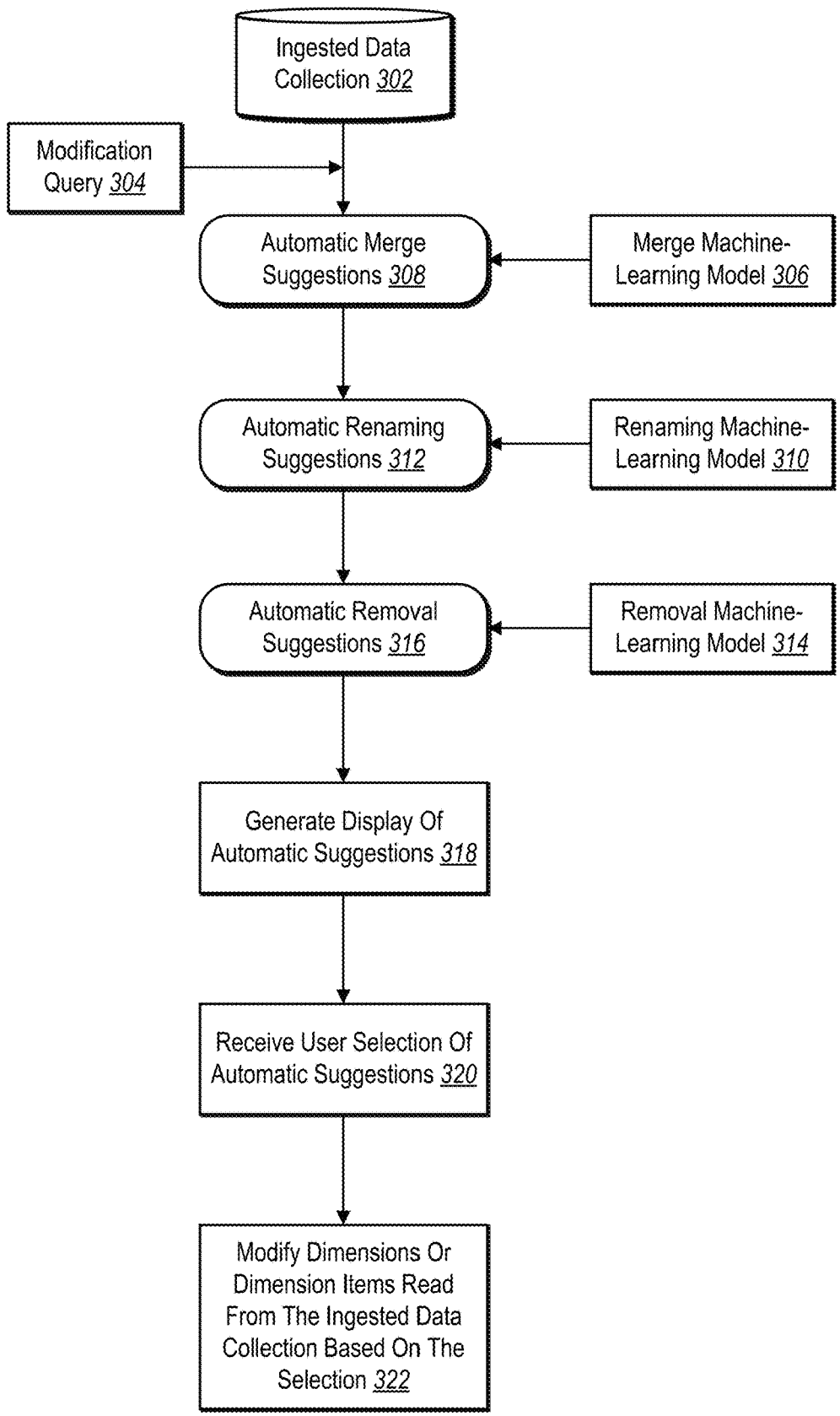
FIG. 3A illustrates a detailed sequence diagram of the automatic modification system utilizing machine learning models in sequence to generate automatic suggestions to effectively modify dimension and dimension items of an ingested data collection in accordance with one or more embodiments.

As mentioned above, in one or more embodiments, the automatic modification system 102 utilizes one or more machine learning models in generating automatic suggestions for modifying dimensions and dimension items read from an ingested data collection. FIG. 3A illustrates an overview schematic of the automatic modification system 102 utilizing a merge machine learning model 306, a renaming machine learning model 310, and a removal machine learning model in generating automatic suggestions to modify the organization of data returned from an ingested data collection 302. For example, as discussed above, the automatic modification system 102 receives the ingested data collection 302 from the digital data analytics engine 108 either in response to a request from the automatic modification system 102, or as part of a scheduled data transfer, or similar.

In at least one embodiment, the automatic modification system 102 generates one or more automatic suggestions to modify the organization of the ingested data collection 302 in response to receiving a modification query 304. For example, the automatic modification system 102 receives the modification query 304 by detecting a user selection of a user interface element within a display of a dimension and the dimension items associated with the dimension. Additionally or alternatively, the automatic modification system 102 generates one or more automatic suggestions to modify the organization of the ingested data collection 302 in response to receiving the ingested data collection 302 from the digital data analytics engine 108.

In one or more embodiments, the automatic modification system 102 generates automatic merge suggestions 308 associated with the ingested data collection 302 utilizing the merge machine learning model 306. For example, and as will be discussed in greater detail below with regard to FIG. 3B, the automatic modification system 102 generates embeddings associated with the dimension items of a dimension of the ingested data collection 302 (e.g., as defined by a schema of the ingested data collection 302), and then determines average pairwise distances between the embeddings. The automatic modification system 102 then generates clusters of pairs with average pairwise distances that are less than a predetermined threshold distance. The automatic modification system 102 then generates merge suggestions based on the pairs of embeddings within the clusters.

In one or more embodiments, the automatic modification system 102 also generates automatic renaming suggestions 312 utilizing the renaming machine learning model 310. For example, and as will be discussed in greater detail below with regard to FIG. 3C, the automatic modification system 102 utilizes the renaming machine learning model 310 to classify words of a phrase and/or letters of a word as correct (e.g., expected) or incorrect (e.g., misspelled). More specifically, the automatic modification system 102 masks words of a phrase (e.g., a multi-word dimension item name)

or letters of a word (e.g., a single-word dimension item name) and predicts the most-likely word or letter for the masked portions of the input phrase or word. The automatic modification system 102 then compares the prediction from the renaming machine learning model 310 to the word or letter in the masked portion. If the prediction does not match the masked portion, the automatic modification system 102 determines that the phrase or word includes an incorrect or misspelled word or letter. The automatic modification system 102 then generates the automatic renaming suggestions 312 based on this determination.

In one or more embodiments, the automatic modification system 102 further generates automatic removal suggestions 316 utilizing the removal machine learning model 314. For example, and as will be discussed in greater detail below with regard to FIG. 3D, the automatic modification system 102 generates embeddings associated with dimensions and/or dimension items of the ingested data collection 302, and determines average similarity scores for each embedding. In at least one embodiment, the automatic modification system 102 determines that an embedding with an average similarity score that does not satisfy a predetermine cut-off similarity score is a candidate for removal from the set. The automatic modification system 102 then generates an automatic suggestion to remove the dimension and/or dimension item associated with the determined embedding.

Although the automatic modification system 102 is discussed as utilizing the merge machine learning model 306, the renaming machine learning model 310, and the removal machine learning model 314 in a given order, other arrangements are possible. For example, in additional or alternative embodiments, the automatic modification system 102 utilizes the merge machine learning model 306, the renaming machine learning model 310, and the removal machine learning model 314 in any order. Additionally or alternative, the automatic modification system 102 utilizes one or two, but not all of the merge machine learning model 306, the renaming machine learning model, and the removal machine learning model 314.

In response to generating one or more of the automatic merge suggestions 308, the automatic renaming suggestions 312, and the automatic removal suggestions 316, the automatic modification system 102 performs an act 318 of generating a display of the automatic suggestions. For example, in one embodiment, the automatic modification system 102 generates the display including multiple selectable option, where each selectable option is associated with one of the generated automatic suggestions. Thus, and as discussed below in greater detail with regard to FIGS. 4A-4D, the automatic modification system 102 performs the act 320 of receiving user selections of the automatic suggestions by detecting user selections of one or more of the selectable options within the display.

Finally, the automatic modification system 102 performs an act 322 of modifying dimensions or dimension items returned from the ingested data collection 302 based on the selection. For example, in one or more embodiments, the automatic modification system 102 effectively modifies a dimension item according to a selected automatic suggestion by generating a fallback regular expression based on the automatic suggestion and aligned to the schema of the ingested data collection 302. The automatic modification system 102 then identifies one or more dimension items that correspond to or are referred to by the fallback regular expression. Finally, the automatic modification system 102 reads data out of the one or more dimension items according to the instructions within the fallback regular expression. In this way, the automatic modification system 102 executes the automatic suggestions to modify the organization of data returned from the ingested data collection 302—without destruction of the data within the ingested data collection 302, and without requiring an additional ingestion of the data.

Figure 3B:
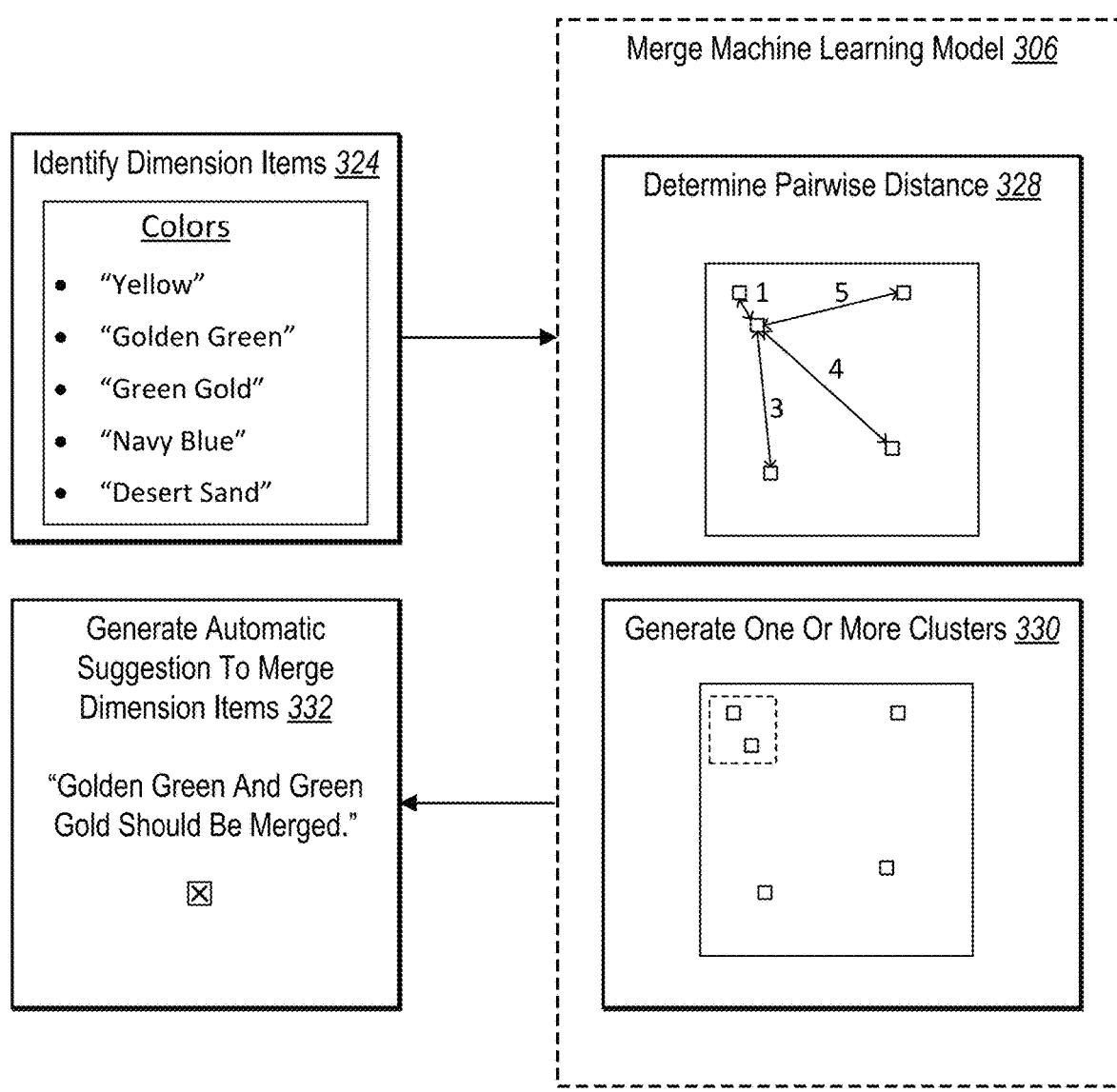
FIG. 3B illustrates a sequence diagram of the automatic modification system utilizing a merge machine learning model to generate automatic suggestions to effectively merge two or more dimension items of an ingested data collection in accordance with one or more embodiments.
Figure 3C:
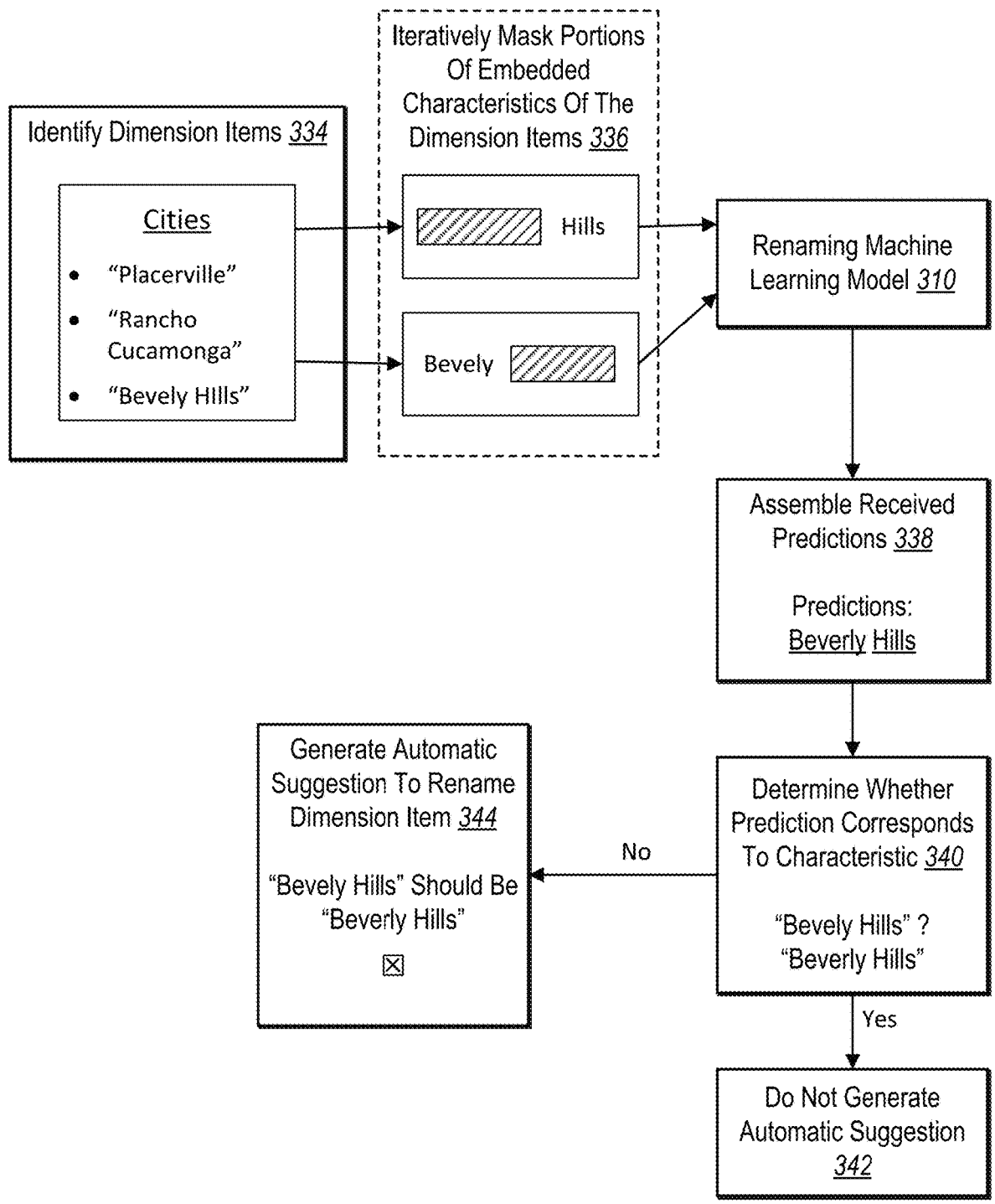
FIG. 3C illustrates a sequence diagram of the automatic modification system utilizing a renaming machine learning model to generate automatic suggestions to effectively rename dimension items of an ingested data collection in accordance with one or more embodiments.
Figure 3D:
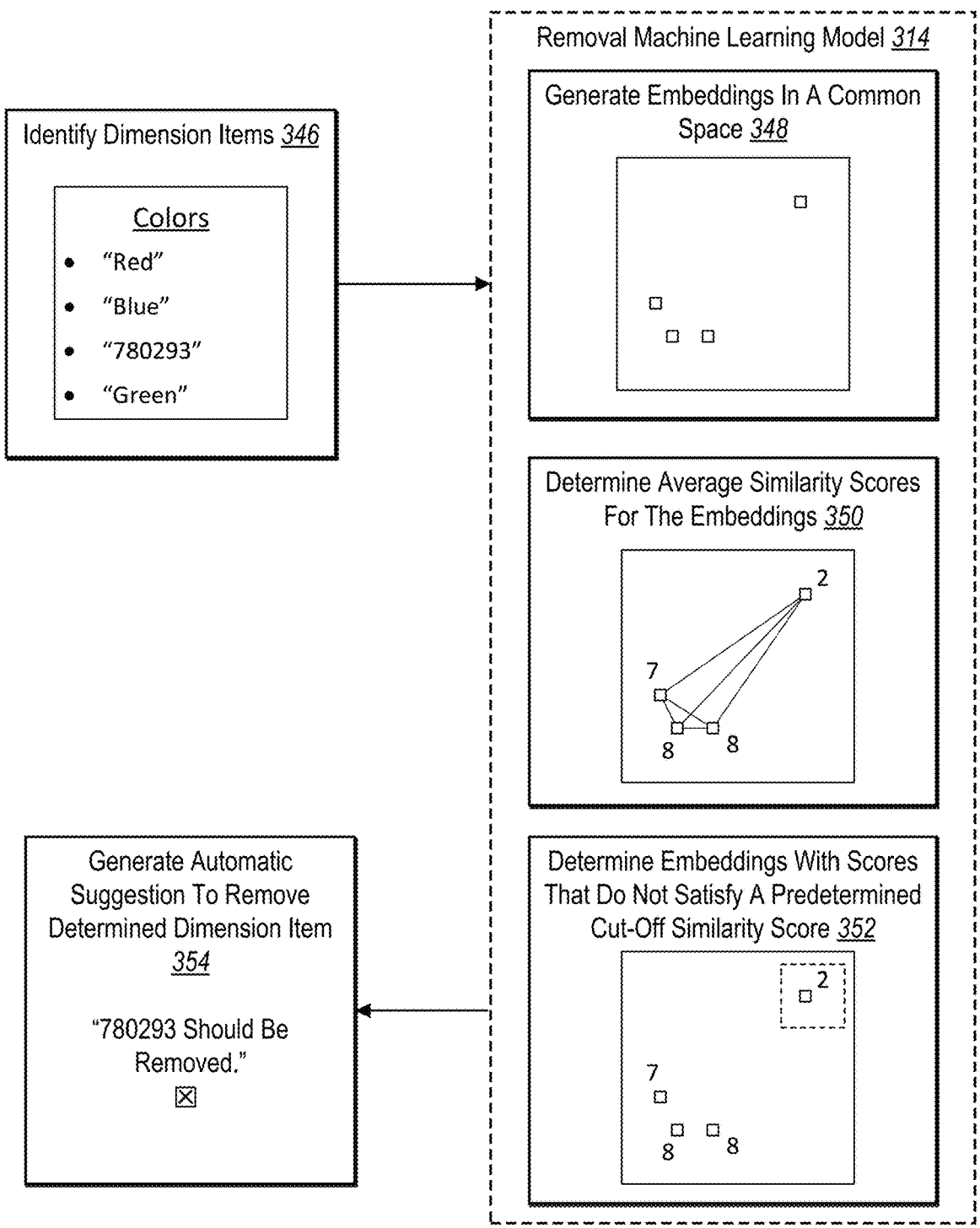
FIG. 3D illustrates a sequence diagram of the automatic modification system utilizing a removal machine learning model to generate automatic suggestions to effectively remove dimension items of an ingested data collection in accordance with one or more embodiments.

As mentioned above, the automatic modification system 102 utilizes the merge machine learning model 306 to generate automatic suggestions to merge dimensions and/or dimension items of an ingested data collection. For example, as illustrated by the schematic diagram in FIG. 3B, the automatic modification system 102 performs an act 324 of identifying dimension items of a particular dimension of an ingested data collection, and utilizes the merge machine learning model 306 to perform an act 332 of generating an automatic suggestion to merge dimension items. In alternative embodiments, the automatic modification system 102 of generates an automatic suggestion to merge dimensions rather than dimension items. Thus, the use of dimension items as examples with reference to FIGS. 3B-3D is illustrative, and in alternative embodiments dimensions rather than dimension items are the basis of automatic edit suggestions.

In more detail, the automatic modification system 102 performs the act 324 of identifying dimension items by identifying one or more characteristics of dimension items based on the schema of the ingested data collection. For example, the automatic modification system 102 identifies a dimension item name (e.g., "yellow," "golden green," "green gold," "navy blue," "desert sand") for each dimension item in the dimension (e.g., "colors) from the associated schema. In additional or alternative embodiments, the automatic modification system 102 identifies other characteristics of the dimension items including, but not limited to, data types, digital storage sizes, and other metadata associated with the dimension items.

In one or more embodiments, the automatic modification system 102 utilizes the merge machine learning model 306 to determine a likelihood that two or more dimension items of the dimension should be merged based on the identified characteristics. For example, as shown in FIG. 3B, the automatic modification system 102 utilizes the merge machine learning model 306 to determine a likelihood that two or more of the dimension items should be merged based on their dimension item names.

In at least one embodiment, the merge machine learning model 306 determines merge likelihoods by comparing distances between dimension item characteristics. For example, in one embodiment, the merge machine learning model 306 performs an act 328 of determining pairwise distances between pairs of strings corresponding to the dimension item names. For example, in one embodiment, the merge machine learning model 306 determines an edit distance between the various pairs of dimension item name strings. More specifically, in that embodiment, the merge machine learning model 306 determines a Levenshtein distance between every pair of dimension item name strings, where the Levenshtein distance represents a number of textual edits needed to transform one text string represented into the other text string represented in the same pair.

To illustrate, the merge machine learning model 306 determines a Levenshtein distance of three between the string "mitten" and the string "fitting" because three edits are required to transform "mitten" to "fitting" (e.g., 1) substituting "f" for "m," 2) substituting "i" for "e," and 3) inserting a "g" at the end). In one or more embodiments, the merge machine learning model 306 determines the Levenshtein distance between two strings a, b (of length |a| and |b| respectively) represented by a pair of embeddings according to lev(a, b) where:

$$lev(a, b) = \begin{cases} |a| & \text{if } |b| = 0, \\ |b| & \text{if } |a| = 0, \\ lev(tail(a), tail(b)) & \text{if } a[0] = b[0], \text{ otherwise:} \\ 1 + \min \begin{cases} lev(tail(a), b) \\ lev(a, tail(b)) \\ lev(tail(a), tail(b)) \end{cases} \end{cases}$$

Where the tail of a string x is all but the first character of x, and x[n] is the nth character of x, starting with character 0.

In additional or alternative embodiments, the merge machine learning model 306 determines pairwise distances in other ways. For example, the merge machine learning model 306 utilizes another edit distance like the Damerau-Levenshtein distance or the Longest Common Subsequence distance. In still further embodiments, the merge machine learning model 306 determines distances between word embeddings for the dimension or dimension item names in a common space. In particular, the merge machine learning model 306 generates word embeddings for each of the dimension item name strings utilizing a word embedding algorithm such as Word2Vec, GloVe, BERT, or another algorithm. The merge machine learning model 306 then determines pairwise distances by determining distance between the embeddings in the embedding space. For example, the merge machine learning model 306 determines cosine distances between embeddings.

Regardless of the method by which the merge machine learning model 306 determines distances between the characteristics of the dimension items, the merge machine learning model 306 performs an act 330 of generating one or more clusters based on the determined distances. For example, the merge machine learning model 306 generates clusters of dimension items by identifying pairs of dimension items with pairwise distances that are less than a predetermined threshold distance. To illustrate, in one embodiment, the merge machine learning model 306 generates a cluster of dimension items including all dimension items pairs with pairwise distances of two or less. For instance, if pairs of dimension items (a,b), (a,c), (a,d), and (a,e) have distances 1, 3, 2, 5, respectively, the merge machine learning model 306 can generate a cluster including the pairs (a,b) and (a,d) because those pairs of dimension items have distances of two or less.

In one or more embodiments, the merge machine learning model 306 utilizes a predetermined threshold distance that is manually configured or specified (e.g., user-specified). In additional or alternative embodiments, the merge machine learning model 306 utilizes an adjustable predetermined threshold distance that automatically scales based on the number of dimension items. In additional or alternative embodiments, the merge machine learning model 306 intelligently selects the predetermined threshold distance based on other factors. In yet additional or alternative embodiments, the merge machine learning model 306 generates clusters of embeddings in other ways, such as, but not limited to an agglomerative clustering algorithm, K-means, fuzzy clustering, or another clustering algorithm.

As further shown in FIG. 3B, the automatic modification system 102 performs an act 332 of generating automatic suggestions to merge dimension items based on the clusters of dimension items. For example, the automatic modification system 102 identifies a cluster with two or more dimension items, and the determines the text strings (e.g., the dimension item names) within the cluster.

The automatic modification system 102 then identifies the dimension items associated with the determined dimension item names. For example, the automatic modification system 102 searches the dimension including the dimension items identified in the act 324 for specific dimension items with dimension item names that match the dimension item names in the cluster. Finally, the automatic modification system 102 generates an automatic suggestion to merge the identified dimension items into a single dimension item.

In one or more embodiments, the automatic modification system 102 generates the automatic suggestion to merge dimension items represented in the cluster into one single dimension item. For example, the automatic modification system 102 identifies a main dimension item represented in the cluster by determining a dimension item with a highest number entries associated therewith (e.g., there are 25 Golden Green colors indicated in the ingested data collection and 5 Green Golds so Golden Green is selected as the main dimension item). In at least one embodiment, the automatic modification system 102 then generates the automatic suggestion to merge the remaining dimension items represented within the cluster into the main dimension item. Additionally or alternatively, the automatic modification system 102 generates the automatic suggestion to merge the dimension items represented in the cluster into a newly generated dimension item. In further alternative embodiments, the automatic modification system 102 identifies the main dimension item represented in the cluster by determining a dimension item represented in the cluster that is associated with a highest metric (e.g., page views, link clicks, etc.).

In at least one embodiment, the automatic modification system 102 generates multiple automatic suggestions to merge groups of dimension items. For example, in response to determining that there are multiple clusters of two or more, the automatic modification system 102 generates an automatic suggestion to merge the dimension items represented among each of the multiple clusters. To illustrate, in response to the merge machine learning model 306 generating a second cluster including a subset of two or more dimension items with pairwise distances less than the predetermined threshold, the automatic modification system 102 generates a second automatic suggestion to merge the dimension items in the second cluster.

In one or more embodiments, the automatic modification system 102 ranks automatic suggestions to merge dimension items. For example, in response to generating more than one automatic suggestion to merge dimension items, the automatic modification system 102 ranks the automatic suggestion based on one or more criteria. For instance, the automatic modification system 102 determines an average inter-cluster distance for each of the multiple clusters generated by the merge machine learning model 306. The automatic modification system 102 then ranks the corresponding automatic suggestions based on the average inter-cluster distances.

To illustrate, in one example, the automatic modification system 102 determines that the average inter-cluster distance of a first cluster is one, and the average inter-cluster distance of a second cluster is two. Accordingly, the automatic modification system 102 ranks the automatic suggestion to merge the dimension items represented in the first cluster ahead of the automatic suggestion to merge the dimension items represented in the second cluster because the dimension items represented in the first cluster are more similar (e.g., have smaller pairwise edit distances) than the dimension items represented in the second cluster. In an alternative embodiment, the automatic modification system 102 ranks automatic suggestions based on other criteria, such as numbers of dimension items represented in the clusters. For example, in such an embodiment, the automatic modification system 102 ranks a cluster representing a higher number of dimension items higher than a cluster representing a lower number of dimension items.

As mentioned above, the automatic modification system 102 sequentially utilizes additional machine learning models to generate additional automatic suggestions to modify dimensions and/or dimension items. As illustrated by the schematic diagram in FIG. 3C, the automatic modification system 102 additionally utilizes the renaming machine learning model 310 to generate automatic suggestions to rename dimension items or dimensions. For instance, the automatic modification system 102 performs an act 334 of identifying dimension items of a particular dimension of an ingested data collection (e.g., the same dimension and ingested data collection discussed above with regard to the act 324 illustrated in FIG. 3B above).

Similar to the act 324 discussed above with reference to FIG. 3B, the automatic modification system 102 performs the act 334 of identifying dimension items of the dimension by identifying a characteristic of the dimension items. For example, the automatic modification system 102 analyzes the schema of the ingested data collection to determine dimension items names (e.g., "Placerville," "Rancho Cucamonga," "Bevely Hills") for the dimension items of a dimension (e.g., "California Cities").

In one or more embodiments, the automatic modification system 102 utilizes the renaming machine learning model 310 by performing an act 336 of iteratively masking portions of embedded characteristics of the identified dimension items. For example, the automatic modification system 102 first generates embeddings of a characteristic of each of the identified dimension item. In one or more embodiments, the automatic modification system 102 generates an embedding representing one or more words of dimension item names, one or more letters of dimension item names, and/or one or more sub-words of dimension item names.

To illustrate, if the dimension item name is "Rancho Cucamonga," the automatic modification system 102 generates an embedding of "Rancho" and an embedding of "Cucamonga." If the dimension item name is "Placerville," the automatic modification system 102 generates an embedding of "Placerville." Additionally or alternatively, the automatic modification system 102 generates an embedding of "Placer" and an embedding of "ville." Additionally or alternatively, the automatic modification system 102 generates embeddings of each individual letter. In one or more embodiments, the automatic modification system 102 further merges averages of the sub-word embeddings to generate a representative embedding of the dimension item name. Thus, the automatic modification system 102 generates embeddings of one or more of letters, words, or sub-words of the dimension item names. The automatic modification system 102 then iteratively masks tokens including letters, words, or sub-words of the generated embeddings to input to the renaming machine learning model 310.

Once the characteristic (e.g., the dimension item name) of the identified dimension items are embedded in a common space, the automatic modification system 102 utilizes the renaming machine learning model 310 in connection with masked portions or tokens of the embedding or embeddings for each dimension item. For example, in one or more embodiments, the renaming machine learning model 310 is a classification model trained to predict a missing token in an embedding. To illustrate, in at least one embodiment, the automatic modification system 102 trains the renaming machine learning model 310 to predict a missing letter from a word, a missing word from a phrase, and/or a missing portion of a word from the word (e.g., predicts "ing" at the end of a root word).

To illustrate, for the dimension item name "Bevely Hills," the automatic modification system 102 generates an embedding of the phrase including "Bevely" and "Hills." The automatic modification system 102 then generates a first input to the renaming machine learning model 310 that includes the generated embedding with the "Bevely" token masked. The renaming machine learning model 310 generates a prediction that the masked token in the embedding is likely associated with the word, "Beverly" (e.g., the correct spelling for the word "Bevely"). Next, the automatic modification system 102 generates and provides a second input to the renaming machine learning model 310 that includes the embedding with the "Hills" token masked. The renaming machine learning model 310 generates a prediction that the masked token within the embedding is likely associated with the word, "Hills."

In response to the renaming machine learning model 310 generating the series of predictions, the automatic modification system 102 performs an act 338 of assembling the received predictions. For example, in response to the renaming machine learning model 310 generating predictions that the masked token in the first input is "Beverly" and the masked token in the second input is "Hills," the automatic modification system 102 can assemble the received predictions into the prediction "Beverly Hills."

The automatic modification system 102 further performs an act 340 of determining whether the prediction corresponds to the original input characteristic (e.g., the original dimension item name). For example, the automatic modification system 102 compares the prediction to the original dimension item name to the predicted dimension item name. To illustrate, the automatic modification system 102 determines whether the prediction "Beverly Hills" matches the dimension item name "Bevely Hills." In one or more embodiments, the automatic modification system 102 determines whether the prediction matches the original input by performing a letter-by-letter comparison. Additionally or alternatively, the automatic modification system 102 utilizes a comparison function such as String Compare to determine whether the prediction matches the original input.

In one or more embodiments, the acts 338 and 340 are performed by one or more layers of the renaming machine learning model 310. For example, in at least one embodiment, the renaming machine learning model 310 includes a softmax layer that assembles predictions and determines whether an assembled prediction matches or corresponds to the input characteristic or string. Thus, in that embodiment, the renaming machine learning model 310 outputs a "Yes" or "No" indicating whether the input matches the prediction. Additionally, the renaming machine learning model 310 also outputs the prediction (e.g., the likely correct spelling of the input) along with a "No" prediction.

In response to determining that the prediction and the input characteristic match (e.g., "Yes" in response to the act 340), the automatic modification system 102 performs an act 342 of determining not to generate an automatic suggestion in connection with the associated dimension item. In response to determining that the prediction and the input characteristic do not match (e.g., "No" in response to the act 340), the automatic modification system 102 performs an act 344 of generating an automatic suggestion to rename the associated dimension item. For example, the automatic modification system 102 generates the automatic suggestion to rename the associated dimension item to match the prediction assembled from the outputs of the renaming machine learning model 310. In one or more embodiments, the automatic modification system 102 performs the acts 336-344 in connection with every dimension item in an identified dimension.

As mentioned above, the automatic modification system 102 trains the renaming machine learning model 310 to predict masked tokens or portions of embeddings representing characteristics (e.g., dimension item names) of dimension items within a dimension of an ingested data collection. In one or more embodiments, the renaming machine learning model 310 is a deep neural language classification machine learning model. In one or more embodiments, the deep neural language classification machine learning model includes, but is not limited to, a Bidirectional Encoder Representations from Transformers (BERT) machine learning model. For example, in one or more embodiments, the renaming machine learning model 310 includes twelve layers, with seven hundred and sixty eight hidden nodes and twelve heads.

To train the renaming machine learning model 310, the automatic modification system 102 generates a training set including pairs of training inputs and corresponding ground truths. For example, the automatic modification system 102 generates the training set by determining ground truths including a robust corpus of words and phrases. The automatic modification system 102 further generates the training set by generating a training input corresponding to each ground truth, where the training input includes the ground truth with one or more incorrect candidates introduced into the ground truth. To illustrate, for a ground truth including "apple," the automatic modification system 102 generates a training input including "epple," "appel," and/or "aple." In one or more embodiment, the automatic modification system 102 generates the training inputs based on common, qwerty keyboard-based misspellings of the corresponding ground truths.

The automatic modification system 102 utilizes the generated training set to train the renaming machine learning model 310 over multiple iterations. For example, in a first iteration, the automatic modification system 102 masks the nth letter or word in a training input word or phrase, provides the masked training input word or phrase to the renaming machine learning model 310, and receives a prediction for the nth letter or word from the renaming machine learning model 310. The automatic modification system 102 then compares the nth letter or word prediction to the nth letter or word from the corresponding ground truth to determine a training loss associated with the renaming machine learning model 310. The automatic modification system 102 propagates the loss back through the renaming machine learning model 310 until the loss is minimized over multiple training iterations. In one or more embodiments, the automatic modification system 102 further utilizes weight decay fix, and warmup and linear decay to further optimize the renaming machine learning model 310.

Once trained, the renaming machine learning model 310 accurately predicts a masked letter, word, or sub-word in an input word or phrase with a high level of accuracy. Furthermore, in one or more embodiments, the renaming machine learning model 310 is bi-directional such that the renaming machine learning model 310 can accurately predict a letter or word at any position within the input. For example, the renaming machine learning model 310 accurately predicts a word at a first, middle, or ending position within an input phrase.

As mentioned above, the automatic modification system 102 generates automatic suggestions to modify the organization of a dimension in other ways beyond merging and renaming, as discussed above. For example, as illustrated by the schematic diagram in FIG. 3D, the automatic modification system 102 also generates automatic suggestions to remove dimensions and/or dimension items from an ingested data collection. In one or more embodiments, the automatic modification system 102 utilizes the removal machine learning model 314 to generate a prediction of one or more dimension items of a dimension that should likely be removed from the dimension.

In more detail, the automatic modification system 102 performs an act 346 of identifying one or more dimension items of a dimension. As discussed above with regard to the acts 324 and 334 in FIGS. 3B and 3C respectively, the automatic modification system 102 performs the act 346 by identifying a characteristic such as a dimension item name associated with each dimension item. For instance, the automatic modification system 102 identifies dimension items names including "Red," "Blue," "780293," and "Green" associated with the dimension items in the dimension "Colors." In one or more embodiments, the automatic modification system 102 provides the characteristics (e.g., dimension item names) of the dimension items as inputs into the removal machine learning model 314. In at least one embodiment, the removal machine learning model 314 determines one or more dimension items that are dissimilar from the rest of the dimension items based on the particular characteristic. For example, the removal machine learning model 314 determines a dimension item from a collection of dimension items that is most dissimilar or significantly dissimilar.

As shown in FIG. 3D, the removal machine learning model 314 performs an act 348 of generating embeddings of the dimension item names in a common space. For example, the removal machine learning model 314 generates the embeddings utilizing any of a variety of embedding functions including, but not limited to, Word2vec, BERT, or embeddings from language models (ELMo). In one or more embodiments, the removal machine learning model 314 generates an embedding for a dimension item name that effectively encodes both the syntax and semantics of the dimension item name into a vector within the common space.

The removal machine learning model 314 further performs an act 350 of determining average similarity scores for the embeddings. For example, the removal machine learning model 314 determines an average similarity score for a particular embedding that represents how similar that embedding is to every other embedding within the common space. In one or more embodiments, the removal machine learning model 314 generates an average similarity score for an embedding by first determining an average pairwise cosine distance between that embedding and the other embeddings in the common space.

For example, the removal machine learning model 314 determines pairs including the embedding and all other embeddings in the common space, and then determines the cosine distances between each pair. The removal machine learning model then determines an average of all the cosine distances to generate the average similarity score for the particular embedding. In one or more embodiments, the removal machine learning model 314 repeats this process for each embedding in the common space.

In additional or alternative embodiments, the removal machine learning model 314 determines an average similarity score for each embedding in the common space in other ways. For example, in one embodiment, the removal machine learning model 314 determines average similarity scores utilizing clustering techniques in connection the embeddings in the common space. To illustrate, the removal machine learning model 314 can generate clusters of embeddings to identify one or more embeddings in the common space that are not clustered. The removal machine learning model 314 can then generate high average similarity scores to the embeddings within clusters, and low average similarity scores to the embeddings that are unclustered.

In the example illustrated in FIG. 3D, the removal machine learning model 314 determines that the embeddings representing the dimension item names: "Red," "Blue," and "Green" have high average similarity scores due to how close those embeddings area to most of the other embeddings within the common space. The removal machine learning model 314 further determines that the embedding representing the dimension item name "780293" has a low average similarity score due to how far away that embedding is from the other embeddings within the common space.

The removal machine learning model 314 further performs an act 352 of determining embeddings with scores that do not satisfy a predetermined cut-off similarity score. For example, the removal machine learning model 314 determines one or more embeddings in the common space with average similarity scores that are lower than the predetermined cut-off similarity score. Alternatively, the removal machine learning model 314 determines one or more embeddings in the common space with average similarity scores that are higher than the predetermined cut-off similarity score. In the example illustrated in FIG. 3D, the removal machine learning model 314 determines that the embedding associated with the dimension item name, "780293," does not satisfy a predetermined cut-off similarity score (e.g., a score of 6) because the average similarity score associated with that embedding is less than the predetermined cut-off similarity score.

The removal machine learning model 314 determines the predetermined cut-off similarity score in a variety of ways. For example, in one embodiment, the removal machine learning model 314 determines the predetermined cut-off similarity score as the average distance between all embeddings in the common space. In another embodiment, the removal machine learning model 314 determines the predetermined cut-off similarity score by utilizing ground truth training data, over multiple iterations, to learn a predetermined cut-off similarity score that identifies dissimilar embeddings with a high-degree of accuracy.

In response to the removal machine learning model 314 determining one or more embeddings that do not satisfy the predetermined cut-off similarity score, the automatic modification system 102 performs an act 354 of generating an automatic suggestion to remove a dimension item corresponding to one of the determined embeddings. For example, the automatic modification system 102 decodes the embedding to identify the associated dimension item characteristic (e.g., the dimension item name). The automatic modification system 102 then determines the dimension item associated with that dimension item characteristic. The automatic modification system 102 then generates the automatic suggestion to remove the determined dimension item from the overall dimension. In the example illustrated in FIG. 3D, the automatic modification system 102 generates an automatic suggestion to remove the dimension item "780293."

As just discussed, the automatic modification system 102 generates one or more automatic suggestions to modify dimension items associated with an ingested data collection. In one or more embodiments, the automatic modification system 102 generates a display including the one or more automatic suggestions. For example, FIGS. 4A-4D illustrate the automatic modification system 102 generating a display of generated automatic suggestions, detecting user selections associated with the generated automatic suggestions, and effectively modifying one or more dimension items in accordance with the selected automatic suggestions.

Figure 4A:
FIGS. 4A-4D illustrate the automatic modification system generating automatic suggestions to modify dimension items of an ingested data collection and effectively modifying dimension items in response to detected selections of the generated automatic suggestions in accordance with one or more embodiments.

For example, as shown in FIG. 4A, the digital data analytics management system 106 generates an analytics management user interface 402 for display on a client computing device (e.g., the client computing device 116d, as shown in FIG. 1). In one or more embodiments, the digital data analytics management system 106 generates the analytics management user interface 402 including a report canvas 404, and a sidebar with a listing of dimensions 406 associated with a particular ingested data collection (e.g., "Ad Campaigns"). In at least one embodiment, the report canvas 404 provides a space within the analytics management user interface 402 where the digital data analytics management system 106 generates and displays various reports associated with dimensions within the current ingested data collection.

In one or more embodiments, the listing of dimensions 406 includes one or more dimension indicators 408-408j that correspond with dimensions within a current or active ingested data collection (e.g., the "Ad Campaigns" ingested data collection). For example, in at least one embodiment, an active ingested data collection includes dimensions with dimension names including "Colors," "Ad Name," "Ad Name (old)," and so forth. In one or more embodiments, the dimension indicators 408a-408j are interactive in connection with the report canvas 404. For instance, in response to a detected user selection of one or more of the dimension indicators 408a-408j (e.g., a drag-and-drop user interaction), the digital data analytics management system 106 generates or updates one or more reports within the report canvas 404.

To illustrate, as shown in FIG. 4A, in response to a detected selection of a "Colors" dimension indicator associated with the "Ad Campaigns" ingested data collection, the digital data analytics management system 106 generates and provides a dimension report display 410 including a dimension report associated with the "Colors" dimension of the active ingested data collection (e.g., "Ad Campaigns). As shown, the dimension report display 410 includes a dimension name 412 of the dimension (e.g., the "Colors" dimension) associated with the report illustrated in the dimension report display 410. Additionally, the dimension report display 410 includes dimension item indicators 414a-414k associated with dimension items of the "Colors" dimension. As shown, each dimension item indicator 414a-414k includes a dimension item name or other data associated with the associated dimension item. The dimension report display 410 also includes other metric displays associated with the dimension items of the current dimension (e.g., "Ad Views" associated with each of the colors in the "Colors" dimension).

As shown in FIG. 4A, the "Colors" dimension includes several likely errors within its dimension items. For example, the dimension report display 410 for the "Colors" dimension indicates that dimension items of that dimension should likely be merged, removed, and/or renamed. In one or more embodiments, the automatic modification system 102 generates one or more automatic suggestions to modify one or more dimension items in response to generating the report within the dimension report display 410, or in response to receiving the ingested data collection "Ad Campaigns" from the digital data analytics engine 108.

Figure 4B:
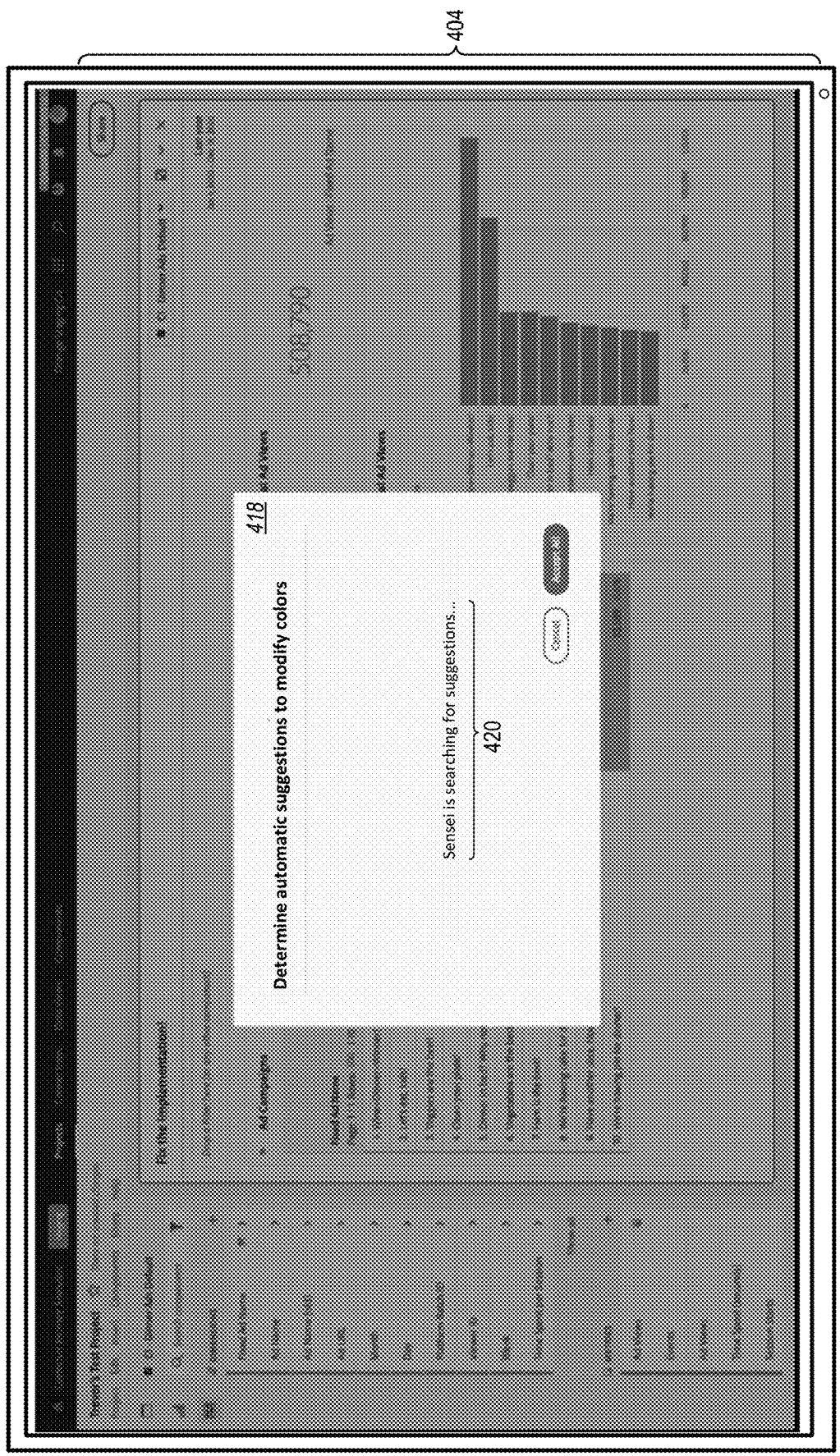

In at least one embodiment, the automatic modification system 102 generates automatic suggestions to modify one or more dimension items associated with the dimension item indicators 414a-414k in response to a detected selection of the automatic suggestions button 416 within the report canvas 404. For example, in response to a detected selection of the automatic suggestions button 416, the automatic modification system 102 generates a display 418, as shown in FIG. 4B. In one or more embodiments, the automatic modification system 102 overlays the display 418 on the report canvas 404. In additional or alternative embodiments, the automatic modification system 102 replaces the analytics management user interface 402 with the generated display 418. In at least one embodiment, the automatic modification system 102 generates the display 418 including one or more notifications 420 while generating automatic suggestions associated with the active dimension (e.g., "Colors) in the report canvas 404.

Figure 4C:
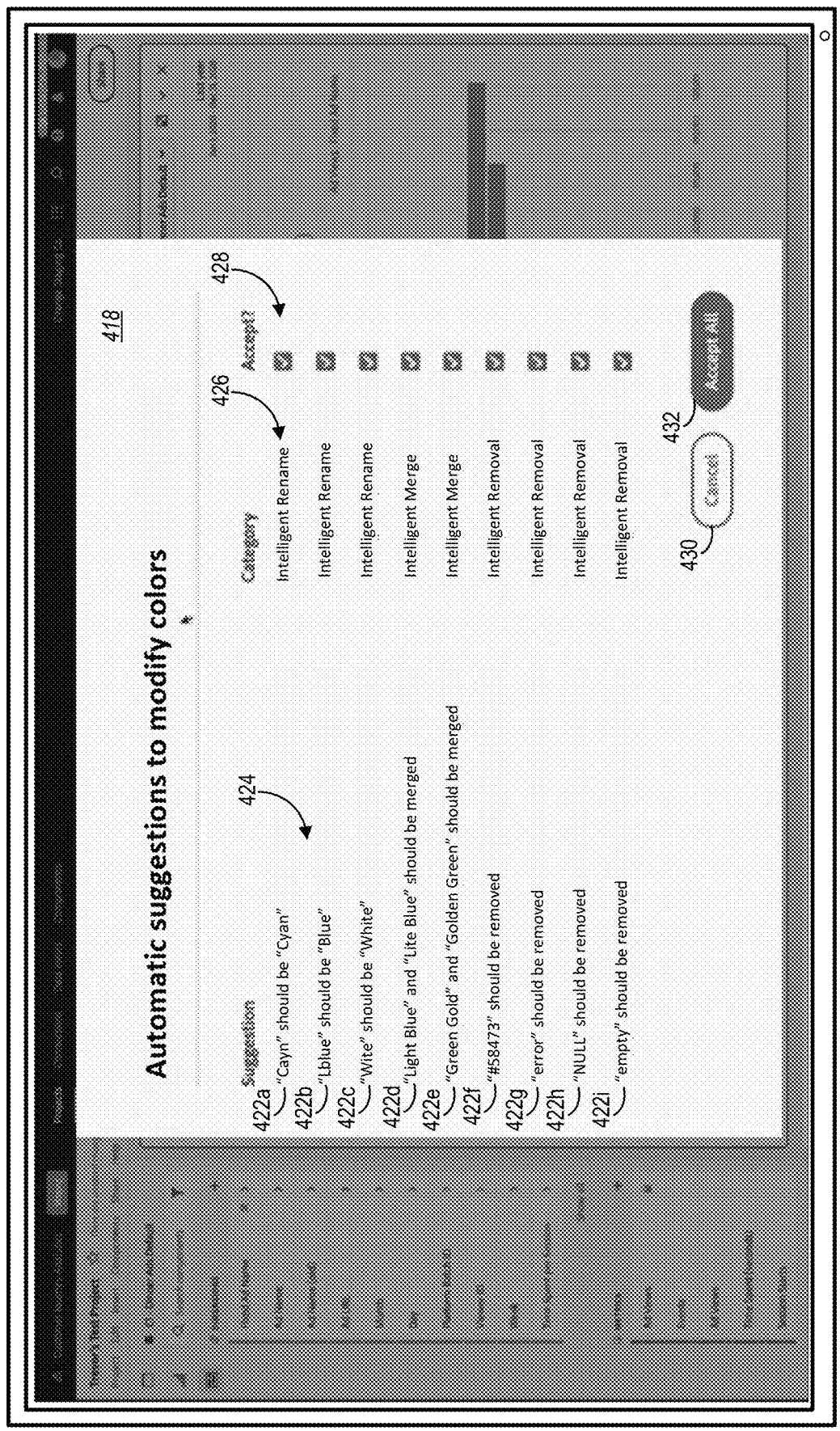

In response to generating one or more automatic suggestions to modify dimension items of the active dimension, the automatic modification system 102 updates the display 418 with the generated automatic suggestions. For example, as shown in FIG. 4C, the automatic modification system 102 updates the display 418 with a listing of automatic suggestions 422a, 422b, 422c, 422d, 422e, 422f, 422g, 422h, and 422i. In one or more embodiments, the automatic modification system 102 further generates display 418 such that each of the automatic suggestions 422a-422i includes a description 424 of the automatic suggestion, a category 426 associated with the automatic suggestion, and a selectable option 428 to accept the automatic suggestion. Additionally, the automatic modification system 102 generates the display 418 including a cancel button 430, and an accept all button 432.

In response to detecting a selection of one or more of the selectable options 428 and/or the accept all button 432, the automatic modification system 102 effectively modifies one or more corresponding dimension items in accordance with the selected automatic suggestions. For example, the automatic modification system 102 determines to effectively modify dimension items corresponding with all of the automatic suggestions in response to a detected selection of the accept all button 432, as shown in FIG. 4C.

In one or more embodiments, the automatic modification system 102 modifies a dimension item in accordance with a selected automatic suggestion by generating a fallback regular expression corresponding to the selected automatic suggestion. For instance, the automatic modification system 102 generates a fallback regular expression corresponding to the selected automatic suggestion by translating the selected automatic suggestion to a set of instructions that are aligned to the schema of the ingested data collection that includes the dimension items effected by the automatic suggestion. Thus, the automatic modification system 102 translates the selected automatic suggestion to a set of instructions that adhere to a syntax, formatting, and/or configuration of the corresponding schema.

In one embodiment, the automatic modification system 102 utilizes the generated fallback regular expression to identify one or more dimension items affected by the selected automatic suggestion. For example, the automatic modification system 102 identifies one or more dimension items referred to by the fallback regular expression by identifying one or more dimension items with dimension item names that match one or more dimension item names included in the fallback regular expression. The automatic modification system 102 then effectively modifies the identified dimension items by reading data out of the identified dimension items according to the instructions in the fallback regular expression.

For example, the automatic modification system 102 effectively modifies two or more dimensions items in accordance with an automatic suggestion to merge the two or more dimension items by generating a fallback regular expression that embodies the automatic suggestion, then identifying the two or more dimension items referred to by the generated fallback regular expression. The automatic modification system 102 then determines a main dimension item from among the two or more dimension items. For example, the automatic modification system 102 determines the main dimension item by determining the dimension item from the two or more dimension items associated with the highest number of instances of embeddings in the cluster (e.g., as discussed above with reference to FIG. 3B). In response to determining the main dimension item, the automatic modification system 102 reads data from the main dimension item and data from the remaining dimension items into a meta-field titled or named to mirror the title or name of the main dimensions item. As such, the automatic modification system 102 effectively merges the data of two or more dimension items into a single dimension item (e.g., the meta-field) that mirrors the main dimension item.

In another example, the automatic modification system 102 modifies a dimension item in accordance with an automatic suggestion to rename the dimension item by generating a fallback regular expression that embodies the automatic suggestion, then identifying the dimension item referred to by the generated fallback regular expression. The automatic modification system 102 then effectively modifies the dimension item by reading data from the identified dimension item into the meta-field that is titled or named according to the fallback regular expression. Thus, when data from the meta-field is updated within a report, the name of the dimension is effectively changed, even though no changes have occurred within the ingested data collection.

In another example, the automatic modification system 102 modifies a dimension item in accordance with an automatic suggestion to remove the dimension item by generating a fallback regular expression the embodies the automatic suggestion, then identifying the dimension item referred to by the generated fallback regular expression. The automatic modification system 102 then effectively modifies the identified dimension item by skipping the dimension item when reading data from the associated dimension. For example, the automatic modification system 102 effectively removes the identified dimension item by reading data from identified dimension item into the meta-field, and naming the meta-field with a predetermined name or string (e.g., "NULL") that causes the digital data analytics management system 106 to disregard meta-field while generating reports and performing other analysis. In this manner, the raw data read from the now-removed dimension item is not destroyed, but rather is disregarded.

Figure 4D:
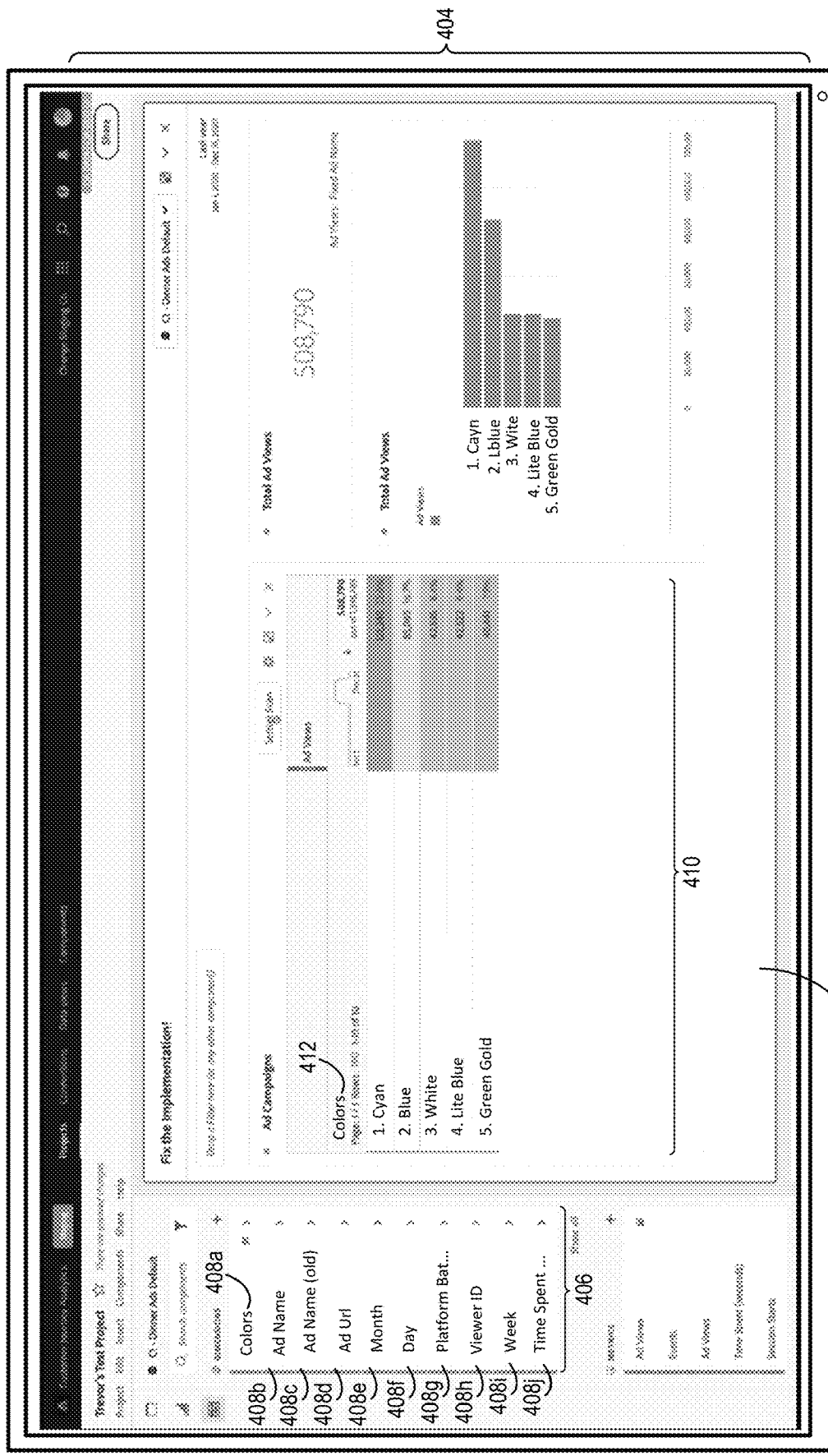

In response to the automatic modification system 102 effectively modifying dimension items in accordance with one or more selected automatic suggestions, the digital data analytics management system 106 updates one or more reports associated with the corresponding dimension. For example, as shown in FIG. 4D, the digital data analytics management system 106 updates the dimension report display 410 within the report canvas 404 of the analytics management user interface 402 to reflect the dimension item modifications by reading data out of the meta-field, as discussed above. As shown, the digital data analytics management system 106 updates the dimension report display 410 for the "Colors" dimension (e.g., indicated by the dimension name 412) to include the effective modifications associated with the automatic suggestions generated by the automatic modification system 102.

For instance, as shown in FIG. 4D, by reading data out of the meta-field, the dimension report display 410 makes it appear that dimension items previously named "Cayn," "Lblue," and "Wite" have been renamed "Cyan," "Blue," and "White," respectively. Additionally, the dimension report display 410 makes it appear that the dimension item previously named "Light Blue" has been merged with the dimension item named "Lite Blue." Moreover, the dimension report display 410 makes it appear that dimension items named "#58473," "error," "NULL," and "empty" have been removed or otherwise earmarked to be skipped.

In one or more embodiments, the automatic modification system 102 is capable of rolling back the modifications to the dimension items. For example, in response to an additional selection of the dimension indicator 408a (e.g., a drag-and-drop onto the dimension report display 410), the digital data analytics management system 106 effectively rolls back the modifications to the one or more dimension items by reading data out of the ingested data collection that is associated with the dimension indicated by the dimension indicator 408a. In other words, the digital data analytics management system 106 queries dimension data from the ingested data collection without any additional instructions to modify how that dimension data is read from the ingested data collection. Thus, if errors exist in among the dimension items of the dimension associated with the dimension indicator 408a, the digital data analytics management system 106 persists these errors within a report of that dimension.

Figure 5:
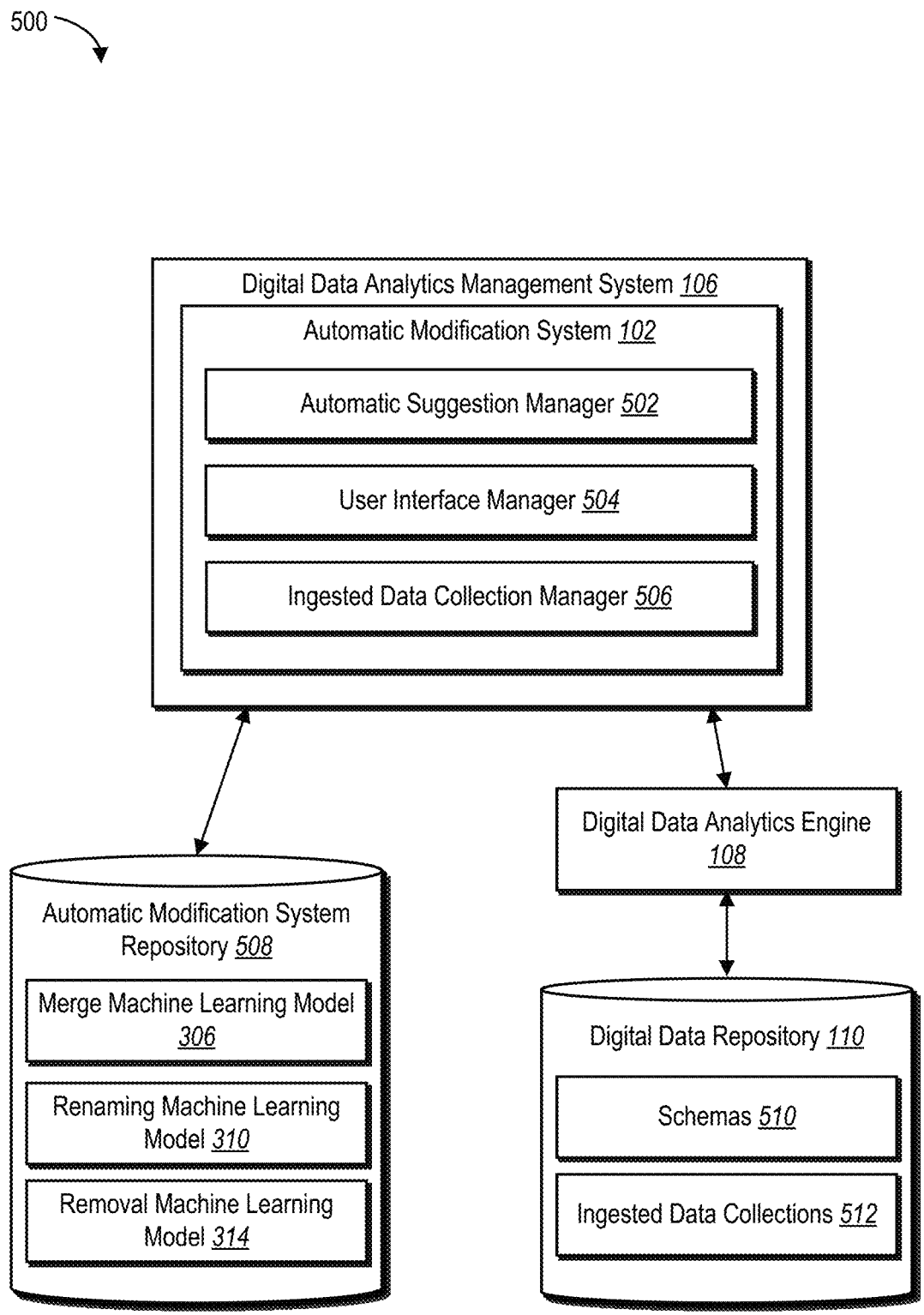
FIG. 5 illustrates a schematic diagram of the automatic modification system in accordance with one or more embodiments.

FIG. 5 illustrates a detailed schematic diagram of an embodiment of the automatic modification system 102 in accordance with one or more embodiments. As discussed above, the automatic modification system 102 is operable on a variety of computing devices. Thus, for example, the automatic modification system 102 is operable on the server(s) 107 (as shown in FIG. 1). Additionally or alternatively, the automatic modification system 102 is operable on the client computing device 116d. In one or more embodiments, the automatic modification system 102 includes an automatic suggestion manager 502, a user interface manager 504, and an ingested data collection manager 506. As further shown in FIG. 5, the automatic modification system 102 operates in connection with an automatic modification system repository 508, and the digital data analytics engine 108, which operates in connection with the digital data repository 110.

As mentioned above, and as shown in FIG. 5, the automatic modification system 102 includes the automatic suggestion manager 502. In one or more embodiments, the automatic suggestion manager 502 utilizes one or more machine learning models in sequence to generate automatic suggestions to modify dimensions and/or dimension items in various ways. For example, the automatic suggestion manager 502 utilizes the merge machine learning model 306, the renaming machine learning model 310, and the removal machine learning model 314 in sequence to generate likelihoods that dimension items should be merged, that dimension items should be renamed, and that dimension items should be removed. The automatic suggestion manager 502 further generates automatic suggestions based on these determined likelihoods.

As mentioned above, and as shown in FIG. 5, the automatic modification system 102 includes the user interface manager 504. In one or more embodiments, the user interface manager 504 generates a display of one or more automatic suggested generated by the automatic suggestion manager 502. For example, the user interface manager 504 generates the display including the automatic suggestion and a selectable element associated with the automatic suggestion. The user interface manager 504 detects one or more user interactions with the generated display (e.g., a selection of a selectable element associated with an automatic suggestion), and reports the detected selection to one or more elements of the automatic modification system 102.

As mentioned above, and as shown in FIG. 5, the automatic modification system 102 includes the ingested data collection manager 506. In one or more embodiments, the ingested data collection manager 506 generates fallback regular expressions based on selected automatic suggestions, and effectively modifies dimensions and/or dimension items in accordance with the generated fallback regular expressions. For example, the ingested data collection manager 506 generates a fallback regular expression based on a selected automatic suggestion by determining a schema of a currently active ingested data collection, and translating the automatic suggestion into a regular expression that aligns with the schema of the currently active ingested data collection. The ingested data collection manager 506 then effectively modifies dimensions and/or dimension items by identifying the dimensions and/or dimension items that are referenced by the fallback regular expression, and retrieving data from or reading data out of the identified dimensions and/or dimension item into a meta-field according to the instructions in the fallback regular expression.

As mentioned above, and as shown in FIG. 5, the automatic modification system 102 operates in connection with the automatic modification system repository 508. In one or more embodiments, the automatic modification system repository 508 maintains the merge machine learning model 306, the renaming machine learning model 310, and the removal machine learning model 314. In one or more embodiments, the automatic modification system repository 508 also stores training data associated with one or more of the machine learning models 306, 310, and 314.

Additionally, as shown in FIG. 5 and as discussed above with reference to FIG. 1, the automatic modification system 102 operates in connection with the digital data analytics engine 108. In one or more embodiments, the digital data analytics engine 108 receives raw data from the user interaction platform 112, and ingests the raw data into ingested data collections 512 based on schemas 510. In at least one embodiment, the digital data analytics engine 108 provides the ingested data collections 512 to the digital data analytics management system 106. In at least one embodiment, the digital data analytics engine 108 also provides the corresponding schemas 510 along with the ingested data collections 512.

Each of the components 502-508 of the automatic modification system 102 includes software, hardware, or both. For example, the components 502-508 includes one or more instructions stored on a computer-readable storage medium and executable by processors of one or more computing devices, such as a client computing device or server device.

When executed by the one or more processors, the computer-executable instructions of the automatic modification system 102 causes the computing device(s) to perform the methods described herein. Alternatively, the components 502-508 includes hardware, such as a special-purpose processing device to perform a certain function or group of functions. Alternatively, the components 502-508 of the automatic modification system 102 includes a combination of computer-executable instructions and hardware.

Furthermore, the components 502-508 of the automatic modification system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-508 may be implemented as a stand-alone application, such as a desktop or mobile application. Furthermore, the components 502-508 may be implemented as one or more web-based applications hosted on a remote server. The components 502-508 may also be implemented in a suite of mobile device applications or "apps." To illustrate, the components 502-508 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, ADOBE TARGET, and ADOBE CUSTOMER JOURNEY ANALYTICS. "ADOBE," "ANALYTICS CLOUD," "ANALYTICS," "AUDIENCE MANAGER," "CAMPAIGN," "EXPERIENCE MANAGER," "CUSTOMER JOURNEY ANALYTICS," "TARGET," and "CREATIVE CLOUD" are either registered trademarks or trademarks of Adobe Systems Incorporated in the United States and/or other countries.

Figure 6:
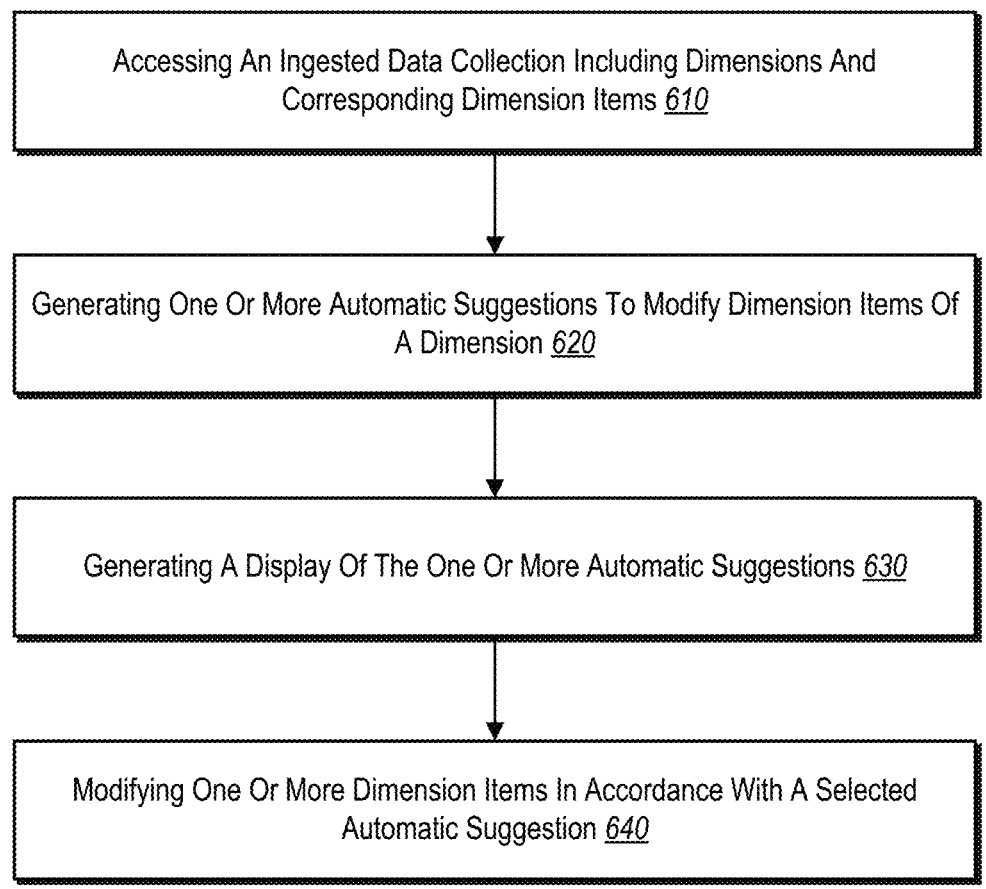
FIG. 6 illustrates a flowchart of a series of acts for generating automatic suggestions to modify the organization of an ingested data collection in accordance with one or more embodiments.

FIGS. 1-5, the corresponding text, and the examples provide a number of different methods, systems, devices, and non-transitory computer-readable media of the automatic modification system 102. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for generating automatic suggestions to modify dimensions or dimension items of an ingested data collection in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the series of acts 600 includes an act 610 of accessing an ingested data collection including dimensions and corresponding dimension items. For example, the act 610 involves accessing an ingested data collection categorized into a plurality of dimensions, wherein each of the plurality of dimensions comprises dimension items.

As further shown in FIG. 6, the series of acts 600 includes an act 620 of generating one or more automatic suggestions to modify dimension items of a dimension. In alternative embodiments, act 620 comprises generating one or more automatic suggestions to modify one or more dimensions or dimension items. In at least one embodiment, the act 620 includes generating the one or more automatic suggestions to modify the one or more dimensions or dimension items in response to a detected selection in connection with a dimension from the plurality of dimensions. For instance, generating the one or more automatic suggestions to modify the one or more dimensions or dimension items includes generating, without user input, one or more of: an automatic suggestion to merge two or more dimensions or dimension items, an automatic suggestion to remove the one or more dimensions or dimension items, or an automatic suggestion to rename the one or more dimensions or dimension items.

In more detail, generating the automatic suggestion to merge the two or more dimensions or dimension items includes: determining pairwise distances between pairs of names of the one or more dimensions or dimension items; generating a first cluster comprising a first subset of pairs with pairwise distances that are less than a predetermined threshold distance; and generating a first automatic suggestion to merge the one or more dimensions or dimension items within the first cluster. For example, generating the first automatic suggestion to merge the two or more dimensions or dimension items within the first cluster further includes: determining a dimension or dimension item with a corresponding highest number of associated values; and further generating the first automatic suggestion to merge remaining dimension or dimension items within the first cluster with the dimension or dimension item with the corresponding highest number of associated values.

In at least one embodiment, the act 620 further includes generating a second cluster comprising a second subset of pairs of embeddings with pairwise distances that are less than the predetermined threshold distance; and generating a second automatic suggestion to merge the one or more dimensions or dimension items within the second cluster. For instance, the act 620 also includes determining inter-cluster distances for the first cluster and the second cluster; and ranking the first automatic suggestion and the second automatic suggestion based on the inter-cluster distances.

Moreover, generating the automatic suggestion to remove the one or more dimensions or dimension items includes: generating embeddings for the one or more dimensions or dimension items; determining an average similarity score for each embedding, wherein the average similarity score represents an average distance between the embedding and every other embedding within the common space; determining one or more embeddings with average similarity scores that do not satisfy a predetermined cut-off similarity score; and generating the automatic suggestion to remove, from the dimension, the one or more dimensions or dimension items corresponding to the determined one or more embeddings with the average similarity scores that do not satisfy the predetermined cut-off similarity score.

Additionally, generating the automatic suggestion to rename the one or more dimensions or dimension items includes: determining names for the dimensions or dimension items generating embeddings of the names within a common space; for each embedding, iteratively: masking a portion of the embedding; predicting a string corresponding to the masked portion of the embedding; comparing the predicted string to the portion of the name corresponding to the masked portion of the embedding; and generating the automatic suggestions to rename the one or more dimensions or dimension items based on the comparing.

In at least one embodiment, the act 620 includes sequentially utilizing one or more machine learning models in connection with the dimension items of the dimension to generate one or more automatic suggestions to modify the one or more dimensions or dimension items. For example, sequentially utilizing the one or more machine learning models in connection with the dimension items of the dimension includes: utilizing a merge machine learning model to determine a likelihood that two or more dimension items should be merged into one dimension item; upon determining a likelihood that two or more dimension items can be merged, utilizing a renaming machine learning model to determine a likelihood that one or more dimensions or dimension items are associated with an incorrect word or phrase; and upon determining a likelihood that one or more dimensions or dimension items are associated with an incorrect word or phrase, utilizing a removal machine learning model to determine a likelihood that one or more dimensions or dimension items should be removed from the dimension.

Additionally as shown in FIG. 6, the series of acts 600 includes an act 630 of generating a display of the one or more automatic suggestions. For example, the act 630 involves generating a display of the one or more automatic suggestions along with selectable options for opting into or out of modifying dimension items based on the automatic suggestions.

As further shown in FIG. 6, the series of acts 600 includes an act 640 of modifying one or more dimensions or dimension items in accordance with a selected automatic suggestion. For example, the act 640 involves, in response to a detected selection of an automatic suggestion from the display, modifying one or more dimensions or dimension items of the dimension when retrieving data from the ingested data collection. More particularly, modifying the one or more dimensions or dimension items of the dimension when retrieving data from the ingested data collection based on a query that invokes the selected automatic suggestion includes reading the one or more dimensions or dimension items out of the ingested data collection to change an organization of the data in a report compared to an organization of the data in the ingested data collection.

In one or more embodiments, modifying the one or more dimensions or dimension items of the dimension when retrieving data from the ingested data collection based on a query that invokes the selected automatic suggestion includes one of: reading a dimension item and another dimension item from the dimension into a meta-field thereby merging the dimension item and the another dimension item, removing at least one dimension item from the dimension when reading data form the ingested data collection in response to the query, or renaming at least one dimension item within the dimension by reading the at least one dimension item into the meta-field named differently from the at least one dimension item. In at least one embodiment, modifying the one or more dimensions or dimension items of the dimension in accordance with the selected automatic suggestion further includes retroactively modifying the one or more dimensions or dimension items without destruction of ingested data organized into the one or more dimensions or dimension items within the dimension of the ingested data collection. For instance, modifying one or more dimensions or dimension items in the dimension is in response to a detected selection of an automatic suggestion from the display, and determining one or more dimensions or dimension items of the dimension that correspond to the automatic suggestion.

In more detail, the act 640 includes determining the one or more dimensions or dimension items of the dimension that correspond to the automatic suggestion by determining two or more dimension items indicated by the automatic suggestion to merge together. In that embodiment, modifying the one or more dimensions or dimension items of the dimension when retrieving data from the ingested data collection based on a query that invokes the automatic suggestion includes: determining a main dimension item of the two or more dimension items; and renaming remaining dimension items of the two or more dimension items by reading the remaining dimension items into a meta-field named to mirror a name of the main dimension item.

The act 640 also includes determining the one or more dimensions or dimension items of the dimension associated with the automatic suggestion by determining a dimension item with a name corresponding with a dimension item indicated by the automatic suggestion to remove. In that embodiment, modifying the one or more dimensions or dimension items of the dimension when retrieving data from the ingested data collection based on the query that invokes the automatic suggestion includes removing the determined dimension from the dimension when reading data from the ingested data collection in response to the query.

The act 640 also includes determining the one or more dimensions or dimension items of the dimension associated with the automatic suggestion by determining a dimension item with a name corresponding with a dimension item indicated by the automatic suggestion to rename. In that embodiment, modifying the one or more dimensions or dimension items of the dimension when retrieving data from the ingested data collection based on the query that invokes the automatic suggestion includes by reading the dimension item into a meta-field named to match a name indicated by the automatic suggestion.

Additionally modifying the one or more dimensions or dimension items in accordance with the automatic suggestion includes: generating a fallback regular expression incorporating the automatic suggestion; and modifying the one or more dimensions or dimension items when retrieving data from the ingested data collection based on instructions in the fallback regular expression.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
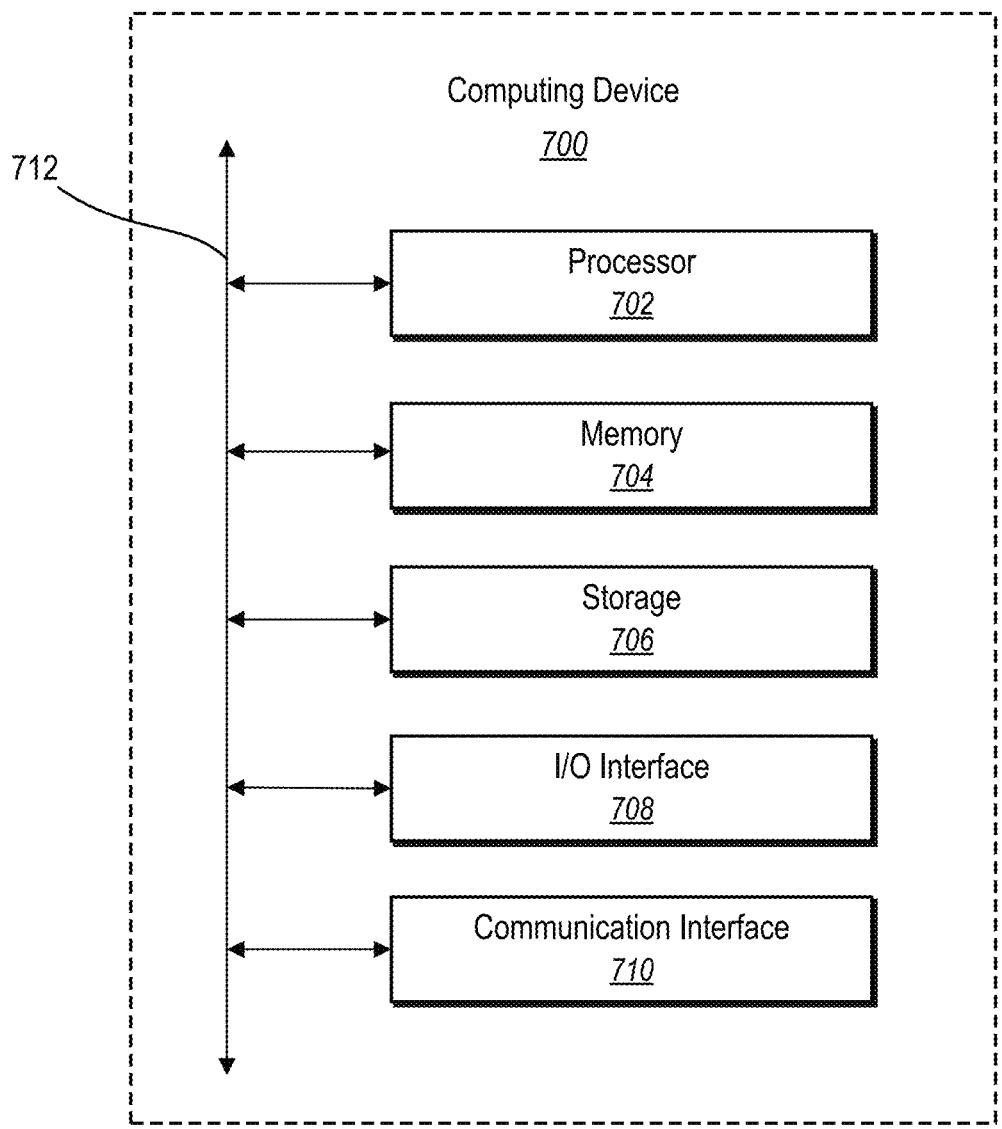
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., the server(s) 107, the client computing devices 116a-116d). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client computing device). Further, the computing device 700 may be a server device that includes cloud-based processing and storage capabilities.

As shown in FIG. 7, the computing device 700 includes one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 includes a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 includes hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 includes hardware, software, or both that connects components of computing device 700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

accessing, by a digital data analytics management system, an ingested data collection categorized into a plurality of dimensions, wherein the ingested data collection includes raw analytics data associated with touchpoints of a plurality of client devices with a third-party computing system ingested into a schema and each of the plurality of dimensions comprises dimension items that indicate pre-defined inputs for interactions between the plurality of client devices and the third-party computing system;

generating a dimension report for the plurality of dimensions comprising the dimension items based on the ingested data collection to display to a client device of the digital data analytics management system, the dimension report showing the raw analytics data organized according to the pre-defined inputs for interactions between the plurality of client devices and the third-party computing system;

utilizing dimension items from the plurality of dimensions to select one or more machine learning models from a plurality of machine learning models;

in response to a query to modify an organization of the ingested data collection, generating one or more automatic suggestions to modify one or more dimensions or dimension items utilizing the selected one or more machine learning models;

generating a display of the one or more automatic suggestions for the client device of the digital data analytics management system; and in response to a detected selection of an automatic suggestion from the display of the client device of the digital data analytics management system, modifying the one or more dimensions or dimension items when retrieving data from the ingested data collection by:

generating a fallback regular expression incorporating the automatic suggestion;

identifying a dimension item or dimension of the one or more dimensions or dimension items referred to by the fallback regular expression;

generating a meta-field according to the fallback regular expression for the dimension item or dimension of the one or more dimensions or dimension items; and reading data from the identified dimension item or dimension of the one or more dimensions or dimension items into the meta-field according to instructions within the fallback regular expression without destroying the data ingested into the schema; and generating an updated dimension report for the identified dimension item or dimension of the one or more dimensions or dimension items by reading data out of the meta-field, the meta-field indicating at least one of an indication to disregard, an indication to merge, or an indication to rename as referred to by the fallback regular expression.

2. The computer-implemented method as recited in claim 1, wherein generating the one or more automatic suggestions to modify the one or more dimensions or dimension items comprises:
generating, without user input and utilizing a first machine learning model trained for determining a likelihood that dimensions or dimension items in the ingested data collection should be merged an automatic suggestion to merge two or more dimensions or dimension items;
generating, without user input and utilizing a second machine learning model trained for determining a likelihood that dimension items in the ingested data collection should be renamed, an automatic suggestion to remove the one or more dimensions or dimension items; or
generating, without user input and utilizing a third machine learning model trained for determining a likelihood that dimension items in the ingested data collection should be removed, an automatic suggestion to rename the one or more dimensions or dimension items.

3. The computer-implemented method as recited in claim 2, wherein generating the automatic suggestion to merge the two or more dimensions or dimension items comprises:
determining pairwise distances between pairs of names of the one or more dimensions or dimension items;
generating a first cluster comprising a first subset of pairs with pairwise distances that are less than a predetermined threshold distance; and
generating a first automatic suggestion to merge the one or more dimensions or dimension items within the first cluster.

4. The computer-implemented method as recited in claim 3, wherein generating the first automatic suggestion to merge the two or more dimensions or dimension items within the first cluster further comprises:
determining a dimension or dimension item with a corresponding highest number of associated values; and
further generating the first automatic suggestion to merge remaining dimension or dimension items within the first cluster with the dimension or dimension item with the corresponding highest number of associated values.

5. The computer-implemented method as recited in claim 3, further comprising:
generating a second cluster comprising a second subset of pairs with pairwise distances that are less than the predetermined threshold distance; and
generating a second automatic suggestion to merge two or more additional dimensions or dimension items within the second cluster.

6. The computer-implemented method as recited in claim 5, further comprising:
determining inter-cluster distances for the first cluster and the second cluster; and
ranking the first automatic suggestion and the second automatic suggestion based on the inter-cluster distances.

7. The computer-implemented method as recited in claim 2, wherein generating the automatic suggestion to remove the one or more dimensions or dimension items comprises:
generating embeddings for the one or more dimensions or dimension items within a common space;
determining an average similarity score for each embedding, wherein the average similarity score represents an average distance between each embedding and other embeddings within the common space;
determining one or more embeddings with average similarity scores that do not satisfy a predetermined cut-off similarity score; and
generating the automatic suggestion to remove the one or more dimensions or dimension items corresponding to the determined one or more embeddings with the average similarity scores that do not satisfy the predetermined cut-off similarity score.

8. The computer-implemented method as recited in claim 2, wherein generating the automatic suggestion to rename the one or more dimensions or dimension items comprises:
determining names for the one or more dimensions or dimension items;
generating embeddings of the names within a common space; and
for each embedding of the embeddings, iteratively:
mask a portion of each embedding;
predict a string corresponding to the masked portion of each embedding;
compare the predicted string to the portion of a name corresponding to the masked portion of each embedding; and
generating the one or more automatic suggestions to rename the one or more dimensions or dimension items based on the comparison.

9. The computer-implemented method as recited in claim 1, further comprising:
in response to the query to modify the organization of the ingested data collection, generating, the one or more automatic suggestions to modify two or more dimensions or dimension items; and
generating a first meta-field and a second meta-field for the two or more dimensions or dimension items, wherein the first meta-field differs from the second meta-field.

10. The computer-implemented method as recited in claim 9, further comprising:
modifying the organization of the ingested data collection by reading data from the ingested data collection according to the first meta-field and the second meta-field,
wherein modifying the organization of the ingested data collection occurs from changing how data for the two or more dimensions or dimension items are read from the ingested data collection based on the first meta-field and the second meta-field.

11. A non-transitory computer-readable storage medium comprising instructions that, when executed by at least one processor, cause a computing device to:
access, by a digital data analytics management system, an ingested data collection categorized into a plurality of dimensions, wherein the ingested data collection includes raw analytics data associated with touchpoints of a plurality of client devices with a third-party computing system ingested into a schema and each of the plurality of dimensions comprises dimension items that indicate pre-defined inputs for interactions between the plurality of client devices and the third-party computing system;
generate a dimension report for the plurality of dimensions comprising the dimension items based on the ingested data collection to display to a client device of the digital data analytics management system, the dimension report showing the raw analytics data organized according to the pre-defined inputs for interactions between the plurality of client devices and the third-party computing system;

in response to a query comprising a detected selection in connection with a dimension from the plurality of dimensions:
  utilize the dimension from the plurality of dimensions to select one or more machine learning models from a plurality of machine learning models;
  generate one or more automatic suggestions to modify one or more dimension items of the dimension utilizing the selected one or more machine learning models;
  generate a display of the one or more automatic suggestions for the client device of the digital data analytics management system; and
  in response to a detected selection of an automatic suggestion from the display of the client device of the digital data analytics management system:
    determine one or more dimension items of the dimension that correspond to the automatic suggestion,
    generate a fallback regular expression incorporating the automatic suggestion,
    identify a dimension item of the one or more dimension items referred to by the fallback regular expression,
    generate a meta-field according to the fallback regular expression for the dimension item of the one or more dimension items, and
    read data from the identified dimension item of the one or more dimension items into the meta-field according to instructions within the fallback regular expression without destroying the data ingested into the schema; and
  generate an updated dimension report for the identified dimension item or dimension of the one or more dimensions or dimension items by reading data out of the meta-field, the meta-field indicating at least one of an indication to disregard, an indication to merge, or an indication to rename as referred to by the fallback regular expression.

12. The non-transitory computer-readable storage medium as recited in claim 11, further comprising instructions that, when executed by the at least one processor, cause the computing device to determine the one or more dimension items of the dimension that correspond to the automatic suggestion by determining two or more dimension items indicated by the automatic suggestion to merge together.

13. The non-transitory computer-readable storage medium as recited in claim 12, further comprising instructions that, when executed by the at least one processor, cause the computing device to modify the one or more dimension items of the dimension when retrieving data from the ingested data collection by:
  determining a main dimension item of the two or more dimension items; and
  renaming remaining dimension items of the two or more dimension items by reading the remaining dimension items into the meta-field named to mirror a name of the main dimension item.

14. The non-transitory computer-readable storage medium as recited in claim 11, further comprising instructions that, when executed by the at least one processor, cause the computing device to:
  determine the one or more dimension items of the dimension associated with the automatic suggestion by determining a dimension item with a name corresponding with a dimension item indicated by the automatic suggestion to remove; and
  modify the one or more dimension items of the dimension when retrieving data from the ingested data collection by removing the determined dimension from the dimension when reading data from the ingested data collection in response to a query.

15. The non-transitory computer-readable storage medium as recited in claim 11, further comprising instructions that, when executed by the at least one processor, cause the computing device to access the ingested data collection categorized into the plurality of dimensions, wherein the plurality of dimensions comprises geographic location, browser, referrer, search engine, device type, product, webpage, gender, purchase, downloads, age, and digital content campaign.

16. The non-transitory computer-readable storage medium as recited in claim 11, further comprising instructions that, when executed by the at least one processor, cause the computing device to determine the one or more dimension items of the dimension associated with the automatic suggestion by determining a dimension item with a name corresponding with a dimension item indicated by the automatic suggestion to rename.

17. The non-transitory computer-readable storage medium as recited in claim 16, further comprising instructions that, when executed by the at least one processor, cause the computing device to:
  modify the one or more dimension items of the dimension when retrieving data from the ingested data collection by reading the dimension item into the meta-field named to match a name indicated by the automatic suggestion, wherein the meta-field is a storage location separate from the ingested data collection; and
  read data out of the meta-field in the storage location separate from the ingested data collection to generate the updated dimension report for the identified dimension item or dimension of the one or more dimensions or dimension items.

18. A system comprising:
  at least one computer memory device comprising:
    a digital data analytics management system;
    at least one ingested data collection organized into a plurality of dimensions and corresponding dimension items, wherein the at least one ingested data collection includes raw analytics data associated with touchpoints of a plurality of client devices with a third-party computing system ingested into a schema and each of the plurality of dimensions comprises dimension items that indicate pre-defined inputs for interactions between the plurality of client devices and the third-party computing system, and
    one or more machine learning models for generating automatic modification suggestions; and
  one or more servers configured to cause the system to:
    sequentially utilize a plurality of machine learning models to generate one or more automatic suggestions to modify one or more dimension items;
    generate a dimension report for the plurality of dimensions comprising the dimension items based on the ingested data collection to display to a client device of the digital data analytics management system, the dimension report showing the raw analytics data organized according to the pre-defined inputs for interactions between the plurality of client devices and the third-party computing system;
    in response to a query to modify an organization of the at least one ingested data collection, generate a display of the one or more automatic suggestions in connection with the dimension report of the one or more dimension items of the plurality of dimensions based on the ingested data collection to provide for display to the client device of the digital data analytics management system; and in response to a detected selection of an automatic suggestion from the display of the client device of the digital data analytics management system:

generate a fallback regular expression incorporating the automatic suggestion;

identify a dimension item of the one or more dimension items referred to by the fallback regular expression;

generate a meta-field according to the fallback regular expression for the dimension item of the one or more dimension items; and read data from the identified dimension item or dimension of the one or more dimensions or dimension items into the meta-field according to instructions within the fallback regular expression without destroying the data ingested into the schema; and update the dimension report of the one or more dimension items by reading data out of the meta-field, the meta-field indicating at least one of an indication to disregard, an indication to merge, or an indication to rename as referred to by the fallback regular expression to reflect modifications from reading data out of the one or more dimension items into the meta-field according to the fallback regular expression.

19. The system as recited in claim 18, wherein the one or more servers are further configured to cause the system to sequentially utilize the plurality of machine learning models by:

utilizing a merge machine learning model to determine a likelihood that two or more dimension items should be merged into one dimension item;

upon determining a likelihood that two or more dimension items can be merged, utilizing a renaming machine learning model to determine a likelihood that one or more dimension items are associated with an incorrect word or phrase; and upon determining a likelihood that one or more dimension items are associated with an incorrect word or phrase, utilizing a removal machine learning model to determine a likelihood that one or more dimension items should be removed from a dimension.

20. The system as recited in claim 18, wherein the one or more servers are further configured to cause the system to read the data out of the one or more dimension items according to the fallback regular expression without destroying the data ingested into the schema by:

in response to a query that involves the one or more dimension items, utilizing the fallback regular expression as an instruction layer to read data from the at least one ingested data collection; and correcting the one or more dimension items from the query when retrieving data from the at least one ingested data collection according to the instruction layer.

* * * * *